(12) United States Patent
Kawamura et al.

(10) Patent No.: US 6,898,814 B2
(45) Date of Patent: May 31, 2005

(54) CUSHION AND MOLD FOR CUSHION

(75) Inventors: Shoji Kawamura, Ohme (JP);
Yukihiro Takeda, Fujieda (JP);
Kenichi Tsuruhashi, Yaizu (JP);
Hirotoshi Kubota, Haibara-gun (JP);
Masao Sasaki, Shimada (JP)

(73) Assignee: France Bed Co., Ltd., Tokyo (JP)

( * ) Notice: Subject to any disclaimer, the term of this patent is extended or adjusted under 35 U.S.C. 154(b) by 0 days.

(21) Appl. No.: 10/218,209

(22) Filed: Aug. 12, 2002

(65) Prior Publication Data

US 2003/0110567 A1 Jun. 19, 2003

Related U.S. Application Data

(63) Continuation-in-part of application No. PCT/JP01/06926, filed on Aug. 10, 2001.

(30) Foreign Application Priority Data

Jan. 18, 2002 (JP) .......................................... 2002-9390

(51) Int. Cl.[7] .............................................. A47C 27/00
(52) U.S. Cl. ................................ 5/655.9; 5/652; 5/724
(58) Field of Search ........................ 5/652.1, 652, 719, 5/724, 655.9

(56) References Cited

U.S. PATENT DOCUMENTS

| | | | | |
|---|---|---|---|---|
| 4,390,640 A | * | 6/1983 | Rasshofer et al. ............. | 521/51 |
| 4,673,605 A | * | 6/1987 | Sias et al. .................... | 428/120 |
| 4,980,940 A | | 1/1991 | Isshiki | |
| 5,749,111 A | * | 5/1998 | Pearce ........................... | 5/652 |

FOREIGN PATENT DOCUMENTS

| | | | |
|---|---|---|---|
| CA | 2006003 | 5/1991 | |
| CN | 1052035 A | 11/1990 | ........... A47C/17/00 |
| CN | 1052035 A | 6/1991 | |
| EP | 0429849 A2 | 10/1990 | |
| EP | 0429849 A2 | 5/1991 | ........... A47C/27/14 |
| JP | 47-19955 | 9/1972 | |
| JP | 60-185956 | 10/1985 | ........... A47C/27/15 |
| JP | 62-31455 | 2/1987 | |
| JP | 02-228965 | 9/1990 | ............ A61G/7/05 |
| JP | 3-165713 | 7/1991 | |
| JP | 52-15307 | 8/1992 | |
| JP | 7-258511 | 10/1995 | |
| JP | 244544 | 9/2000 | |
| JP | 181364 | 7/2001 | |
| JP | 2001-514912 | 9/2001 | ........... A47C/27/00 |
| JP | 2002-78569 | 2/2002 | ........... A47C/27/00 |
| WO | WO 99/08571 | 2/1999 | ........... A47C/27/00 |
| WO | 99/08571 | 3/1999 | |

OTHER PUBLICATIONS

Japanese Search Report, With Translation, for International Application No. PCT/JP01/06926, Issued Jun. 11, 2002.
Applicants' Comments on Document Nos. JP 2001–514912, JP 2002–78569, SHO 47–19955, SHO 60–185956, and HEI 2–228965.

* cited by examiner

Primary Examiner—Michael F. Trettel
Assistant Examiner—Fredrick Conley
(74) Attorney, Agent, or Firm—Darby & Darby

(57) ABSTRACT

A bed cushion providing a soft feeling without bottomed feeling and providing a cushionability even against a small load and a durability, and a bed using the cushion; a forming die for cushion capable of smoothly and neatly releasing a product by reducing a sticky feeling and a blocking produced when releasing the cushion formed by using elastomer; the cushion, comprising thin-walled partition walls erected parallel with each other generally in a lattice shape in plan view, whereby a soft contact feeling near a water bed can be provided while preventing air blow noise from being produced by a user.

5 Claims, 23 Drawing Sheets

PRIOR ART

CUSHION AND MOLD FOR CUSHION

CROSS REFERENCE TO RELATED APPLICATION

This application is a continuation in part of International Application No. PCT/JP01/06926 filed Aug. 10, 2001.

BACKGROUND OF THE INVENTION

1. Field of the Invention

The invention of the present application relates to a cushion made of elastomer and a bed using the same.

The invention of the present application relates to a bed cushion made of elastomer and a bed using the same, and more particularly to a cushion with thin diaphragms arranged in a lattice.

The invention of the present application relates to a cushion made of elastomer that is used for a bed for preventing bedsore, a normal bed, a chair, a sofa, or the like and exhibits a satisfactory property.

The invention of the present application relates to a mold for forming a cushion used for a bed for preventing bedsore, a normal bed, a chair, a sofa, or the like.

2. Description of the Related Art

Bed cushions are required to have comfortableness during sleep as well as a function of supporting and holding a weight of a human. Specifically, the cushions are required to have appropriate softness, compressibility, high vibration absorption, deformation compliance, and no flattening. In the past, cotton, web of synthetic short fiber, synthetic resin foam such as polyurethane, coil springs, or the like has been used alone or in combination.

Attention is also directed to shapes of bed cushions, and a known bed cushion has, for example, an uneven surface, or thin and vertical diaphragms arranged in a lattice. A known bed cushion with thin and vertical diaphragms arranged in a lattice, for example, has the diaphragms made of sponge rubber, semirigid materials, or gel materials (Japanese Utility Model Laid-Open No. 52-15307, U.S. Pat. No. 5,749,111 specification). The diaphragm made of sponge rubber provides cushioning by compression of the sponge rubber of the diaphragm, which is likely to cause, so called, a feeling of touching a bottom.

The cushion with the diaphragms made of semirigid materials provides cushioning by tilting the diaphragms toward a side, and thus there are disadvantages of lacking softness when a user lies thereon and inferiority in soft absorption of light load. Especially, there is hardness in bounce which the user feels when the user's body touches the diaphragms forming the cushion to start to be compressed.

The diaphragm made of gel materials provides cushioning by bending the gel materials of the diaphragm and has good cushioning, but has a problem of lacking durability such as early occurrence of, so called, flattening because it is the gel material.

As described above, for forming the cushion with thin and vertical diaphragms arranged in a lattice on plan view, a molds is required that configures gaps (cavities) for forming thin diaphragms in a lattice on plan view when the mold is fitted.

A mold N100a for forming the above described cushion has diaphragms Nb formed in a lattice on plan view by forming protrusions N102 in substantially square prisms arranged vertically and horizontally in a protruding manner from a substrate N101, and filling resin such as semirigid materials in gaps (cavities) N102a formed between the protrusions N102 to thereby (FIG. 27).

As a mold for forming a similar cushion, there is a mold N100b constituted by a lower mold N100b1 and an upper mold N100b2 as shown in FIG. 28.

The lower mold N100b1 has a predetermined number of protrusions N103 formed into substantially square prisms and provided in a standing manner and insertion spaces N104 to be formed in the protrusions N103, alternately arranged in one plane formed by a substrate N109.

The upper mold N100b2 has protrusions N105 in substantially square prisms to be inserted in the respective insertion spaces N104 of the lower mold N100b1 with gaps N107 to be cavities for forming diaphragms Nb of the cushion left, and insertion spaces N106 in which the respective protrusions N103 of the lower mold N100b1 are inserted to form the gaps N107 to be cavities, alternately arranged in one plane formed by a substrate N100. Then, the lower molds N100b1 and upper N100b2 are fitted, and, with peripheries thereof surrounded by a frame mold N100c, resin such as semirigid materials is filled into the gaps N107 formed between the molds N100b, N100b2 to form the diaphragms Nb.

As described above, when forming the cushion with the diaphragms in a lattice on plan view using soft resin materials such as semirigid materials by the lower molds N100a, upper molds N100b, a product can be relatively easily removed from the molds after forming the cushion because of high removability of the product.

This cushion is a cushion having a structure where thin and vertical diaphragms are arranged in a lattice on plan view as described above, and causes no feeling of touching a bottom in use and can maintain high absorption for a long time by forming the diaphragms using elastomer such as thermoplastic elastomer or rubber.

This cushion is formed by the mold using elastomer having a relatively sticky surface such as styrene based thermoplastic elastomer, or polyolefin based thermoplastic elastomer. Therefore, when a product is removed from the mold after forming, the sticky surface of the product sometimes attaches cavity surfaces or corners in the cavity of the mold (blocking). In this case, there are problems that removal from the mold takes time to prevent smooth removal operation of the product, and that a stripping trace caused by forceful removal remains on a surface of the cushion subjected to serious blocking.

The object is to provide a mold from which a product can be easily and neatly removed by effectively reducing stick or blocking caused when removing the cushion that is formed using sticky elastomer in forming as described above from the mold.

The cushion PD has high absorption. However, when load is applied by contact with the user, the diaphragms formed in a lattice are appropriately bent and buckled to thereby achieve absorption, so that openings of the lattice that receives the user's body are sometimes blocked by the body of the user PA (FIG. 29).

This often happens when the user rolls over, and air in the lattice blocked by a weight of the user is compressed and jetted from a gap generated between the opening and the user's body, sometimes hissing. This noise is relatively small, but may annoy a sick user. Further, the cushion configured as described above provides satisfactory cushioning, but compared with a cushion containing liquid or gel materials such as a water bed, a feeling of touch which a user feels when touching it is different, and a soft feeling of touch like the water bed cannot be achieved.

Further, four diaphragms are concentrated to form a cross at a crossing portion of the respective diaphragms arranged in a lattice. This compromises flexibility at a center of each crossing portion of the cushion and generates bounce like partial protrusions, and sometimes gives an uncomfortable feeling to a user when he lies on a contact surface of the cushion.

This cushion is a cushion having a structure where thin and vertical diaphragms are arranged in a lattice on plan view as described above, and causes no feeling of touching a bottom in use and can maintain high absorption for a long time by forming the diaphragms using elastomer such as thermoplastic elastomer or rubber.

The above described cushion has high absorption, but when the diaphragms having received load are buckled to thereby achieve absorption, and thus, compared with a cushion containing liquid or gel materials such as a water bed, an initial feeling of touch which a user feels when he lies thereon is different, and a soft feeling of touch like the water bed cannot be achieved.

SUMMARY OF THE INVENTION

An invention of the present application relates to a cushion made of elastomer.

From a study of noise (noise generation) generated when stress is applied on or removed from a cushion formed from the elastomer into a specific shape, the inventors have found that the noise generation mainly occurs when the stress is applied on the cushion to cause the diaphragms to be buckled and attached to each other, when the applied stress is removed to cause the diaphragms to be separated from each other, or when the attached diaphragms rub against each other, and from a study of prevention of the noise generation, the inventors have found that it can be achieved by mixing a large amount of lubricant into the elastomer forming the diaphragm, mixing filler, or low expansion, thereby completing the present invention.

Specifically, the present invention is directed to a cushion with thin and vertical diaphragms to be buckled when pressed arranged in a lattice, characterized in that the diaphragm is made of elastomer and contains lubricant of 0.3 to 10 parts by weight with respect to the elastomer of 100 parts by weight. The lubricant is preferably fatty acid based lubricant. The elastomer forming the diaphragm preferably further contains filler. The elastomer forming the diaphragm is preferably low expansion elastomer with an expansion ratio of 1.01 to 2. The elastomer forming the diaphragm preferably has Shore A hardness of 20 to 40. The elastomer forming the diaphragm is preferably polystyrene based thermoplastic elastomer. The elastomer forming the diaphragm is preferably elastomer into which acrylic soft resin is mixed. Powder is preferably attached to the elastomer forming the diaphragm. The present invention is also directed to a bed using the above described cushion.

A first invention of the present application is directed to a bed cushion with thin and vertical diaphragms to be buckled when pressed arranged in a lattice, characterized in that the diaphragms are made of elastomer having Shore A hardness of 20 to 40. The lattice is preferably in a square shape, a length to width ratio thereof being substantially identical to a length to width ratio of a bed. The elastomer of the diaphragm is preferably styrene based thermoplastic elastomer.

The present invention is also directed to a bed characterized in that the bed cushion is placed in a fixing frame in which the cushion is fitted, an upper edge of the cushion being coupled to an upper edge of the fixing frame.

A cushion according to the invention of the present application is a cushion made of elastomer integrally formed with elastic thin diaphragms arranged in a lattice on plan view, characterized in that an air vent is provided in a predetermined position of the diaphragm.

Specifically, the elastic thin diaphragms are arranged in a lattice on plan view to thereby form an integrally structured cushion, and the diaphragms are elastically buckled to achieve satisfactory cushioning.

Also, the air vent is provided in an appropriate area of the diaphragm, so that when the diaphragm is buckled with the opening of the lattice blocked by the user's body, air in the lattice is flown out into an adjacent lattice through the air vent. Therefore, even if the inside of the diaphragm is compressed by rolling over of the user, drastic injection of a large amount of air from the opening to generate injection noise is prevented.

Further, providing the air vent in the appropriate position of the diaphragm as described above allows the air vent to change a deformation property of the diaphragm to be flexible.

A cushion according to the invention of the present application includes elastic thin diaphragms, each diaphragm being thinner at its upper edge than its lower edge, thereby providing flexible deformation like a tip of a brush at the upper edge of each diaphragm to be a contact surface of the cushion.

The invention of the present application is directed to a mold for a cushion, characterized in that it includes a first mold, a second mold, and an outer frame that form a cushion with thin and vertical diaphragms arranged in a lattice on plan view.

The first mold is formed with a predetermined number of substantially prism-like first protrusions provided in a standing manner on a plane of a mold substrate. Insertion spaces in which second protrusions of the second mold are inserted are formed between the first protrusions. The second mold is formed with a predetermined number of substantially prism-like second protrusions provided in a standing manner on a plane of a mold substrate, and insertion spaces in which the first protrusions of the first mold are inserted are formed between the second protrusions.

The first protrusions of the first mold and the insertion spaces, and the second protrusions of the second mold and the insertion spaces, respectively are alternately arranged like a checkerboard in one plane of the mold substrate, and when the molds are fitted, each of the protrusions is inserted in the other of the insertion spaces with a gap to be a cavity for forming the diaphragm being left.

As described above, a side surface of each of the substantially prism-like first protrusions of the first mold and a side surface of each of the substantially prism-like second protrusions of the second mold are provided with drawing gradients of the same angle to be tapered in such a manner that a square on an end surface at a protruding tip becomes somewhat smaller. Therefore, when the first mold and the second molds are fitted, the protrusions of the first mold are inserted in the insertion spaces of the second mold, and the protrusions of the second mold are inserted in the insertion spaces of the first mold.

In a fitted state of the first and second molds, an outer frame is fitted to surround four peripheral surfaces thereof.

Thus, a gap (cavity) for forming a side wall to be a peripheral frame of the cushion is formed between the peripheries of the fitted first and second molds and an inner surfaces of the outer frame, and in a fully fitted state of the molds, cavities for forming the diaphragms of the cushion are formed in a lattice on plan view in each mold.

In the cavities of the molds for a cushion fitted as described above, a semirigid material such as thermoplastic elastomer is filled. Thus, the cushion with relatively thin diaphragms arranged in a lattice on plan view can be formed in the cavity.

A mold according to the invention of the present application includes a first mold, a second mold, and an outer frame. The second mold is formed with a predetermined number of substantially prism-like protrusions provided in a standing manner on a plane of a mold substrate, and insertion spaces are formed between the respective protrusions. Insertion spaces are formed between the respective projections. In the insertion spaces, space keeping protrusions lower than the protrusions are formed. The space keeping protrusions and the protrusions are alternately arranged like a checkerboard in one plane.

The first mold is formed with inserting portions in which the respective protrusions of the second mold are inserted. Between the respective inserting portions, middle protrusions to be abutted against protrusion end surfaces of the space keeping protrusions formed in the insertion spaces of the second mold are formed in a protruding manner. The middle protrusions and the inserting portions are alternately arranged like a checkerboard in one plane such as a mold substrate.

Thus, in a fitted state of the first and second molds, each of the protrusions of the second mold is inserted in the inserting portion of the first mold.

Simultaneously therewith, each middle protrusion of the first mold is inserted in the insertion space of the second mold, and abuts against the end surface of the space keeping protrusion that protrudes in the insertion space to form an identical contour to each protrusion of the second mold.

In the fitted state, a gap to be a cavity for forming the diaphragm of the cushion is formed between each protrusion of the second mold and the middle protrusion and space keeping protrusion of the first mold in a coupled state.

As described above, in the fitted state of the first and second molds, an outer frame is fitted to surround four peripheral surfaces thereof. Thus, a gap for forming a diaphragm to be a peripheral frame of the cushion is formed between the four peripheral surfaces of the fitted first and second molds and an inner surface of the outer frame.

In the cavities of the molds for a cushion fitted as described above, thermoplastic elastomer is filled. Thus, the cushion with relatively thin diaphragms arranged in a lattice on plan view can be formed in the cavity.

As described above, dismantling the outer frame and the first and second molds causes the cushion made of thermoplastic elastomer formed in the mold to remain in the second mold having high adhesion. That is, the cushion formed in a lattice remains fitted in the gaps between the middle protrusions.

For the above described cushion, a portion of the space keeping protrusion having abutted against the end surface of the middle protrusion is removed to be opened with the second mold removed. Therefore, in removal operation of the product, a worker can take out the cushion remaining in the first mold easily and neatly by drawing with picking an opening edge and striping a wall of the product from the surface of the mold.

The invention of the present application is also directed to a bed that uses the above described cushion laid on a spring unit including springs connected in parallel, each spring including large numbers of coil springs connected in parallel.

DETAILED DESCRIPTION OF THE PREFERRED EMBODIMENTS

Next, a first invention of the present application will be described.

Figure 1:
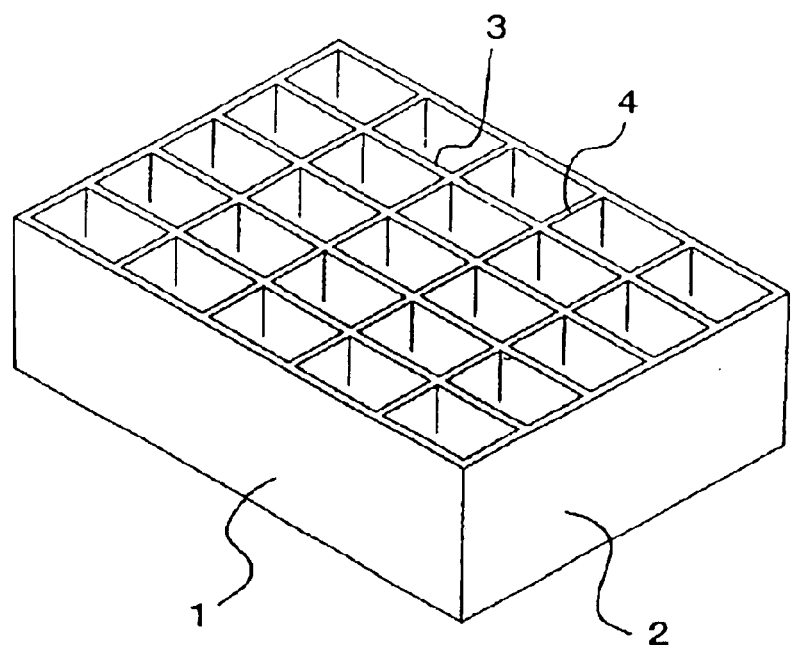
FIG. 1 is a perspective view of a bed cushion that embodies the present invention.

FIG. 1 is a schematic perspective view of a bed cushion according to the invention. The whole thereof is made of elastomer. Reference numeral 1 denotes a vertical side wall of the bed cushion, and reference numeral 2 denotes a horizontal side wall of the bed cushion. Reference numeral 3 denotes a vertically arranged diaphragm, and reference numeral 4 denotes a horizontally arranged diaphragm. The diaphragm 3 and diaphragm 4 form a lattice. When pressed, that is, when load is applied, the diaphragms of the pressed portion are buckled to act as a cushion.

Thermoplastic elastomer used in the present invention includes thermoplastic elastomer or rubber. The thermoplastic elastomer is a material that behaves as a rubber-like elastic body at room temperatures, and whose composition is deformed due to an increase in temperature. The thermoplastic elastomer includes polystyrene based thermoplastic elastomer, polyolefin based thermoplastic elastomer, polyvinyl chloride based thermoplastic elastomer, polyester based thermoplastic elastomer, polyurethane based thermoplastic elastomer, polyamide based thermoplastic elastomer, 1,2-polybutadiene based thermoplastic elastomer, fluororubber based thermoplastic elastomer, chlorinated polyethylene based thermoplastic elastomer, dynamic cross-linked thermoplastic elastomer, or the like.

The polystyrene based thermoplastic elastomer is a block copolymer using polystyrene as a hard segment in a molecule, and using polydiene such as polygutadiene or polyisoprene as a soft segment. For example, a styrene-butadiene-styrene block copolymer (SBS), styrene-isoprene-styrene block copolymer (SIS), styrene-ethylene butylene-styrene block copolymer (SEBS), styrene-ethylene propylene-styrene block copolymer (SEPS), or the like are included, and mixture of hydrogenated styrene-butadiene block copolymer and polypropylene are also included.

Used as the polyolefin based thermoplastic elastomer are a mechanical blend of olefin based rubber such as EPDM or isobutylene-isoprene rubber or polyolefin based rubber (a blend type), a blend of the olefin based rubber and polyolefin resin mixed in the presence of organic peroxide to have a rubber phase partially cross-linked (a partial cross-linked blend type), a complex containing polypropylene as a continuous phase and cross-linked EPDM as a disperse phase (a complete cross-linked blend type), or the like.

The polyvinyl chloride based thermoplastic elastomer includes a blend of polyvinyl chloride and nitrile rubber or partially cross-linked nitrile rubber, or the like.

The polyester based thermoplastic elastomer includes, for example, a polyester polyether type elastomer produced by ester interchange and polycondensation with dimethyl terephthalate, 1,4butanediol and polytetramethylene ether glycol as raw material, and polyester polyester type elastomer produced by ester interchange and ring-opening reaction with dimethyl terephthalate, 1,4butanediol and ε-caprolactone as raw materials. The polyurethane based thermoplastic elastomer includes elastomer with a hard segment and soft segment formed by reacting long-chain diol and short-chain diol having terminal active hydrogen and diisocyanate.

The polyamide based thermoplastic elastomer includes, for example, elastomer produced by ring-opening reaction and condensation with lauryl lactam, dicarboxylic acid, and polyether diol as raw materials.

Used as rubber is natural rubber or synthetic rubber. The synthetic rubber includes polybutadiene rubber, polychloroprene rubber, polyisoprene rubber, butadiene acrylonitrile rubber, isobutylene isoprene rubber, or the like.

For the elastomer used in the present invention, the polystyrene based thermoplastic elastomer is especially preferably used because of its high flexibility and durability. The elastomer used in the present invention has Shore A hardness of 20 to 40, preferably 25 to 35. When the elastomer having the above described hardness is used for diaphragms for a bed cushion having a structure where thin and vertical diaphragms are arranged in a lattice, the diaphragms are buckled when load is applied to thereby provide a cushion that causes no feeling of touching a bottom, and that has flexibility, high absorption of light load and high durability.

The cushion having the diaphragm made of the elastomer as described above has a problem of noise generated every time a user rolls over for the above described reason when used for a bed for example, but this problem can be solved by mixing lubricant into the elastomer, and removability in forming can be improved. The lubricant includes hydrocarbon based lubricant such as paraffin wax, microwax, or polyethylene wax; fatty acid based lubricant such as stearic acid, behenic acid, or 12-hydroxystearic acid; higher alcohol based lubricant such as stearyl alcohol, or cetyl alcohol; amide based lubricant such as stearic acid amide, erucic acid amide, oleic acid amide, methylene bis stearic acid amide, ethylene bis oleic acid amid; ester based lubricant such as cetyl palmitate, stearyl stearate, butyl stearate, or stearic acid monoglyceride, pentaerythritol tetrastearate; metallic soap based lubricant such as lead stearate, zinc stearate, calcium stearate, magnesium stearate. Among them, the fatty acid based lubricant produces a preferable effect. A larger amount of lubricant has to be mixed than in usual use, and the amount is 0.3 to 10 parts by weight, preferably 0.5 to 5 parts by weight with respect to elastomer of 100 parts by weight.

Further mixing filler into the elastomer forming the diaphragm of the cushion of the present invention of the application can reduce elasticity of the diaphragm, thereby improving prevention of noise generation. Mixing the filler also improves removability in forming. Preferable filler is mineral filler. For example, powdered filler such as calcium carbonate, barium sulfate, talc, quartz powder, or silica; balloon filler such as glass balloons or Shirasu balloon; fiber filler such as glass fiber, or mineral fiber. Among them, calcium carbonate, resin coated calcium carbonate (for example, Calpet: trade name of resin coated calcium carbonate manufactured by NITTO FUNKA KOGYO K.K.), and glass balloon (for example, Scotch Light: trade name of a minute hollow glass balloon manufactured by SUMITOMO 3M Limited) are preferably used. The mixing amount of the filler is 0.5 to 30 parts by weight, preferably 1 to 10 parts by weight with respect to elastomer of 100 parts by weight.

Mixing acrylic soft resin into the elastomer forming the diaphragm of the cushion according to the present invention can soften the elastomer to improve prevention of noise generation. The acrylic soft resin is resin that presents flexibility like soft polyvinyl chloride at room temperature. A preferable acrylic soft resin is a polymer of a multilayer structure, that is, a polymer in which two or more kinds of acrylic polymers form a core shell type multilayer structure. Such acrylic soft resin presents satisfactory flexibility at room temperature, has durability to bending, and is superior in transparency and weather resistance.

The core shell type acrylic polymer is a core shell acrylic polymer including, as a core, a polymer made by emulsion polymerization of a crosslinking agent such as butyl acrylate monomer or a mixture of butyl acrylate monomer and 2-ethylhexyl acrylate, (meta) acrylic ester having alkyl groups of carbon numbers 1 to 4, vinyl cyanide, maleic acid mono alkyl ester, or diacrylate or divinyl benzene of polyalcohol, and including, as a shell, a polymer made by polymerization of aromatic vinyls, vinyl cyanide, and crosslinking agent.

Another example of acrylic soft resin will be shown. It is a multilayer structure polymer made by combination of 10 to 90 parts by weight of a polymer layer [A] with at least one layer made by polymerization of monomer mixture, at Tg temperature of 30° C. or less, consisting of 30 to 99.9% by weight of at least a kind of acrylic acid alkyl ester having alkyl groups of carbon numbers 1 to 12, 0 to 70% by weight of at least a kind of methacrylic acid alkyl ester having alkyl groups of carbon numbers 1 to 8, 0 to 30% by weight of copolymerizable unsaturated monomer, 0.1 to 10% by weight of polyfunctional crosslinkable monomer and/or polyfunctional graft monomer, with 90 to 100 parts by weight of a polymer layer [B] with at least one layer made by polymerization of monomer mixture, at Tg temperature of −20° to 50° C., consisting of 30 to 99.9% by weight of at least a kind of acrylic acid alkyl ester having alkyl groups of carbon numbers 1 to 12, 1 to 70% by weight of at least a kind of methacrylic acid alkyl ester having alkyl groups of carbon numbers 1 to 8, 0 to 30% by weight of copolymerizable unsaturated monomer, and is acrylic soft multilayer structure resin whose outermost layer is the polymer layer [B].

Another example of acrylic soft resin will be shown. It is acrylic soft multilayer structure resin consisting of 30 to 80 parts by weight of a rubber layer obtained by polymerization of 60 to 99.5% by weight of acrylic acid alkyl ester having alkyl groups of carbon numbers 1 to 8, 0 to 39.5% by weight of monofunctional monomer having one copolymerizable vinyl group, 0.5 to 5% by weight of polyfunctional monomer having at least two vinyl groups or vinyliden groups, and 20 to 70 parts by weight of a hard resin layer obtained by polymerization of 40 to 100% by weight of meta-acrylic acid methyl, 0 to 60% by weight of acrylic acid alkyl ester having alkyl groups of carbon numbers 1 to 8, and 0 to 20% by weight of a monomer having a copolymerizable vinyl group or vinyliden group, and whose outermost layer is a hard resin layer.

Another example of acrylic soft resin will be shown. It is acrylic soft multilayer structure resin consisting of (A) 5 to 30 parts by weight of an innermost hard polymer layer made by polymerization of monomer mixture consisting of 80 to 98.99% by weight of methyl methacrylate, 1 to 20% by weight of acrylic acid alkyl ester having alkyl groups of carbon numbers 1 to 8, 0.01 to 1% by weight of polyfunctional graft agent, and 0 to 0.5% by weight of polyfunctional crosslinking agent; (B) 20 to 45 parts by weight of a middle hard polymer layer made by polymerization of monomer mixture consisting of 70 to 99.5% by weight of acrylic acid alkyl ester having alkyl groups of carbon numbers 1 to 8, 0 to 30% by weight of methyl methacrylate, 0.5 to 5% by weight of polyfunctional graft agent, and 0 to 5% by weight of polyfunctional crosslinking agent; (C) 50 to 75 parts by weight of an outermost hard polymer layer made by polymerization of monomer mixture consisting of 90 to 99% by weight of methyl methacrylate, 10 to 1% by weight of acrylic acid alkyl ester having alkyl groups of carbon numbers 1 to 8; and having an average particle size of 0.01 to 0.3 µm.

This acrylic soft resin especially produces a preferable effect when mixed into polystyrene based thermoplastic elastomer. An amount of mixture of the acrylic soft resin into the elastomer is 0.5 to 10 parts by weight with respect to 100 parts by weight of the elastomer.

Antioxidant is preferably mixed into the elastomer. Used as antioxidant is phenolic antioxidant, thioether based antioxidant, phosphoric acid based antioxidant, and the most preferable is the phenolic antioxidant. The phenolic antioxidant includes 2,6-di-t-butyl-4-methylphenol, n-octadecyl-3-(3',5'-di-t-butyl-4'-hydroxyphenyl)propionate, triethylene glycol-bis-[3-(3-t-butyl-4-hydroxy-5-methylphenyl) propionate]. An amount of mixture is 0.3 to 4 parts by weight, preferably 2 to 3 parts by weight, with respect to 100 parts by weight of the elastomer. Durability is insufficiently improved with the amount of 0.3 parts by weight or less, and the effect is unchanged with the amount of 4 parts by weight or more.

The cushion according to the present invention can be used for a chair, or bed, and a size of the cushion is appropriately determined in accordance with each use. For example, in a cushion used for a bed, a lattice of the cushion is formed to have a height of the diaphragm of 10 to 300 mm, and a width of the diaphragm of 20 to 200 mm. The diaphragms include diaphragms arranged vertically of the bed, and diaphragms arranged horizontally of the bed, and a ratio of the width of the diaphragms arranged vertically and the width of the diaphragms arranged horizontally of the bed is preferably substantially identical to a length to width ratio the bed. This improves cushioning during sleep. A thickness of the diaphragm is 0.5 to 5 mm, preferably 1.5 to 3 mm. Either reducing the thickness of the diaphragm using harder elastomer, or increasing the thickness of the diaphragm by using softer elastomer to the contrary compromises natural cushioning during sleep. For obtaining soft and natural cushioning without touching the bottom with respect to a weight of a human body, the hardness of the elastomer and the thickness of the diaphragm are important factors. In this view, elastomer having Shore A hardness of 25 to 38 is used to form a diaphragm having thickness of 1.5 to 3.0 mm.

Low expansion of the elastomer forming the diaphragm can increase the effect of preventing noise generation described above. Expansion ratio is preferably 1.01 to 2. The expansion can be carried out with an expanding agent in a usual manner. Attaching powder on a surface of the elastomer forming the diaphragm can also increase the effect of preventing noise generation. Used as the powder is starch such as corn starch, flour, or potato, silicone, silicone coated starch. These are attached by an air spray or the like.

In the present invention, a cushion where the thin and vertical diaphragms made of elastomer are arranged in a lattice is preferably produced by injection molding of the elastomer. The cushion according to the present invention can be used for a pillow, seat (chair), or bed, and a size of the cushion is appropriately determined in accordance with each use. For example, the injection molding produces a cushion having a size of 25 cm×25 cm. A plurality of the cushions are then joined to have a predetermined size of the bed for providing a bed cushion. For joining, the side walls of the respective cushions are coupled. An adhesive, a wire or stapler are used for coupling, but upper portions only are preferably coupled so as to prevent an increase in thickness over the diaphragms at a coupling portion by coupling the side walls, that have an influence on buckling. The diaphragms at the coupling portions may be previously formed thinner than other portions. Blending the thermoplastic elastomer while heating at a temperature 150° C. or more reduces its Shore A hardness value. By using this, the Shore A hardness value of the thermoplastic elastomer can be adjusted. In the above described injection molding, the thermoplastic elastomer is heated up to around 200° C. and blended, so that the Shore A hardness value of raw thermoplastic elastomer is preferably adjusted in consideration of this point.

A soft plate may be provided on an upper surface and/or a lower surface of the bed cushion with thin and vertical diaphragms of elastomers arranged in a lattice as required. The soft plate is preferably flexible and transfers load of a human body as it is to the diaphragms of the cushion. The soft plate is a polyurethane foam sheet, for example. The entire plate may be covered with a cloth as required.

The above described cushion may be used for the bed as it is, but the bed cushion is preferably placed in a fixing frame in which the cushion is fitted to form a bed by coupling an upper edge of the cushion to an upper edge of the fixing frame. They are coupled by an adhesive, a wire, a stapler, or the like. The fixing frame may be made of wood, synthetic resin or metal. Coupling the upper edge of the bed cushion to the upper edge of the fixing frame causes the bed cushion to be suspended by the fixing frame, thereby achieving sufficient cushioning by the buckled diaphragms. Such suspended structure produces tension in a shorter horizontal direction, but does not produces much tension in a longer vertical direction than in the horizontal direction. However, substantially identical tension in the vertical and horizontal directions provides good cushioning. The tension can be changed by either of two methods: changing the thickness of the diaphragm; or changing the width of the diaphragm. Changing the thickness of the diaphragm causes inconvenience in production, so that changing the width of the diaphragm for adjustment is preferable. It is described above from this viewpoint that the ratio of the width of the diaphragms arranged vertically and the width of the diaphragms arranged horizontally of the bed is preferably substantially identical to a length to width ratio of the bed.

A cushion with the above described shape was injection molded at resin temperature of 200° C., and removal temperature of 50° C. using compositions shown in Table 1. The cushion was sized to have a length of 35 cm and a width of 24 cm with five lattices vertically arranged and five lattices horizontally arranged, each lattice having a height of the diaphragm of 150 mm, vertical width of the diagram of 69 mm, horizontal width of the diagram of 48 mm, and thickness of the diagram of 2.0 mm. In Table 1, Clayton D1107 (manufactured by Shell, trade name) represents styrene-isoprene-styrene block copolymer (15% styrene content, Shore A hardness 37). Calpet M (manufactured by NITTO FUNKA KOGYO K.K., trade name) represents 20% resin coated calcium carbonate. Scotch Light K46 (manufactured by SUMITOMO 3M Limited, trade name) represents a minute hollow glass balloon. SA-1000-FO (manufactured by KURARAY CO., LTD.) represents core shell type acrylic soft resin, and AO-60 (Asahi Denka Kogyo K.K.) represents phenolic antioxidant.

Five cushions were vertically joined and five cushions are horizontally joined to create the bed cushion. A polyurethane foam sheet was disposed on and under the joined material, and then the entire material was covered with a polyester fiber cloth. Then, the material was fitted in a wooden fixing frame having inside dimensions of 173 cm length, 121 cm width, and 20 cm height. The upper edge of the fixing frame previously had large numbers of holes drilled. The upper edge of the bed cushion was coupled to the upper edge of the fixing frame with wires using the holes to create a bed. A comfortable bed was obtained. A bed similarly created with powder (manufactured by NIKKA LIMITED, trade name: Nikkariko) attached to the injection molded cushion by an air spray achieved improvement in preventing noise generation.

Removability in injection molding of the cushion, and a degree of noise generation of the bed created using the cushion in use (in rolling over) was tested, and the results were collectively shown in Table 1.

For evaluation of removability, "Very well" represents removing from the mold very well, "Well" represents removing from the mold well, "Not well" represents removing from the mold being a little difficult, and "Poor" represents removing from the mold being impossible.

For evaluation of noise generation, "Very well" represents not obstructive at all, "Well" represents not obstructive though there is noise, "Not well" represents a little obstructive, and "Poor" represents obstructive.

A bed was similarly created with powder (manufactured by NIKKA LIMITED, trade name: Nikkariko) attached to the injection molded cushion by an air spray. Improvement in preventing noise generation was achieved.

TABLE 1

|  | Specific example | | | | | Comparative example |
|---|---|---|---|---|---|---|
|  | 1 | 2 | 3 | 4 | 5 | 1 |
| Clayton D1107 | 80 | 100 | 100 | 100 | 100 | 100 |
| Azodicarboxylic acid amide | 1 | — | — | — | 1 | — |
| Stearic acid | 2 | 2 | 2 | 2 | 2 | 0.1 |
| Ethylene bisamide | 0.1 | 0.1 | 0.1 | 0.1 | 0.1 | 0.1 |
| Calpet M | 10 | 20 | — | — | — | — |
| Scotch Light K46 | 10 | — | 20 | — | — | — |
| SA-1000-F0 | 20 | — | — | 20 | — | — |
| A0-60 | 2.5 | 2.5 | 2.5 | 2.5 | 2.5 | — |
| Expansion ratio | 1.05 | 1 | 1 | 1 | 1.05 | 1.05 |
| Removability | Very well | Well | Well | Well | Not well | Poor |
| Noise generation in rolling over | Very well | Well | Well | Well | Not well | Poor |

The cushion according to the present invention has the diaphragms that are buckled when load is applied, so that it causes no feeling of touching a bottom, has flexibility, high absorption of light load and high durability, generates no noise when the load is applied or removed, and has good removability in forming. This cushion is suitable for a bed cushion.

A resilience reinforcing agent is mixed into the elastomer. The resilience reinforcing agent includes hydrozincite, magnesium oxide, white carbon, carbon black, clay (kaolin clay, burnt clay, or the like). Resilience of the elastomer is obstructive, and "Poor" represents obstructive and having a problem.

TABLE 2

|  | Test example | | | | | | | Comparative example | | | |
|---|---|---|---|---|---|---|---|---|---|---|---|
|  | 1 | 2 | 3 | 4 | 5 | 6 | 7 | 1 | 2 | 3 | 4 |
| Clayton D1107 | 100 | 100 | 100 | 100 | 100 | 100 | 100 | 100 | 100 | 100 | 100 |
| Stearic acid | 3 | 3 | 3 | 3 | 3 | 3 |  | 3 | 3 |  | 3 |
| Process oil |  |  |  |  | 10 |  |  |  |  |  |  |
| Hydrozincite | 5 | 5 | 2 | 20 | 5 |  | 5 |  |  |  |  |
| Magnesium oxide |  |  |  |  |  | 5 |  |  |  |  |  |
| Calcium carbonate |  |  |  |  |  |  |  |  |  |  | 5 |
| AO-60 | 2 | 2 | 2 | 2 | 2 | 2 | 2 | 2 | 2 | 2 | 2 |
| Rubber antioxidant | 0.3 | 0.3 | 0.3 | 0.3 | 0.3 | 0.3 | 0.3 | 0.3 | 0.3 | 0.3 | 0.3 |
| Pigment | 0.02 | 0.02 | 0.02 | 0.02 | 0.02 | 0.02 | 0.02 | 0.02 | 0.02 | 0.02 | 0.02 |
| Height of lattice-like cushion (cm) | 15 | 6 | 6 | 6 | 6 | 6 | 6 | 6 | 15 | 6 | 6 |
| Spring mat (cm) | No | 9 | 9 | 9 | 9 | 9 | 9 | 9 | No | 9 | 9 |
| (Results of operational suitability tests) |  |  |  |  |  |  |  |  |  |  |  |
| Flattening (resilience) | ⊚ | ○ | ⊚ | ○ | ○ | ⊚ | ⊚ | Δ | × | × | Δ |
| Remarks |  |  |  | Somewhat hard |  |  |  |  |  |  |  |
| Noise generation | ○ | ○ | ○ | ○ | ○ | ○ | ⊚ | ⊚ | ⊚ | × | ○ | improved by mixing the resilience reinforcing agent. The mixing amount of the resilience reinforcing agent is 2 to 20 parts by weight, preferably 3 to 10 parts by weight with respect to elastomer of 100 parts by weight. The hydrozincite is the most preferable resilience reinforcing agent. Calcium carbide cannot be used because of the poor resilience reinforcing effect thereof, though it is also an inorganic substance.

An elastomer composition consisting of compositions shown in Table 2 was prepared. Clayton D1107 represents styrene-isoprene-styrene block copolymer (manufactured by Shell, trade name, 15% styrene content, Shore A hardness 37). AO-60 (manufactured by Asahi Denka Kogyo K. K.) represents phenolic antioxidant. Stearic acid was used as an anti-blocking agent. This composition was deforming extruded at 200° C. to create a cushion structure having a length of 35 cm and a width of 24 cm that includes five lattices vertically arranged and five lattices horizontally arranged, each lattice having a height of the diaphragm of 150 mm or 60 mm, a vertical width of the diaphragm of 69 mm, a horizontal width of the diaphragm of 48 mm, and a thickness of the diaphragm of 2.0 mm. Powder (manufactured by NIKKA LIMITED, trade name: Nikkariko) was attached to the cushion structure by an air spray. Shore A hardness of the diaphragm of this structure was 34. Five structures were vertically joined and five structures were horizontally joined to create a bed cushion.

Operational suitability tests were conducted for a case of using the bed cushion as it is and a case of using it laid on a 9 cm thick coil spring unit. In the test, for each bed having used for one month, a trace left on the bed after thirty minutes from leaving the bed was observed to evaluate resilience. Noise generation in rolling over for each bed was also evaluated. The results are collectively shown in Table 2. For evaluation of resilience, "Very well" represents no trace left, "Well" represents little trace left, "Not well" represents a little trace left, and "Poor" represents most of the trace left. For evaluation of noise generation, "Very well" represents not obstructive at all, "Well" represents not obstructive though there is noise, "Not well" represents a little obstructive, and "Poor" represents obstructive and having a problem.

Next, a using manner of the cushion will be described.

The bed cushion of the present invention of the application may be used for the bed as it is, but the bed cushion is preferably placed in a fixing frame in which the cushion is fitted to form a bed by coupling an upper edge of the cushion to an upper edge of the fixing frame. They are coupled by an adhesive, a wire, a stapler, or the like. The fixing frame may be made of wood, synthetic resin or metal. Coupling the upper edge of the bed cushion to the upper edge of the fixing frame causes the bed cushion to be suspended by the fixing frame, thereby achieving sufficient cushioning by the buckled diaphragms. Such suspended structure produces tension in a shorter horizontal direction, but does not produces much tension in a longer vertical direction. Substantially identical tension in the vertical and horizontal directions provides good cushioning.

Next, the cushion according and a manner of using its mold will be described.

After the molds are fitted, a material made of thermoplastic elastomer is charged into the gap to be cavities, and the cavities are filled therewith. The thermoplastic elastomer is especially preferable in terms of recyclability and workability. Specifically, elastomers of styrene base, polyurethane base, polyolefin base, polyvinyl chloride base, polyester base, or polyamide base, or the like are used, thereby achieving satisfactory cushioning like a water bed.

Figure 12:
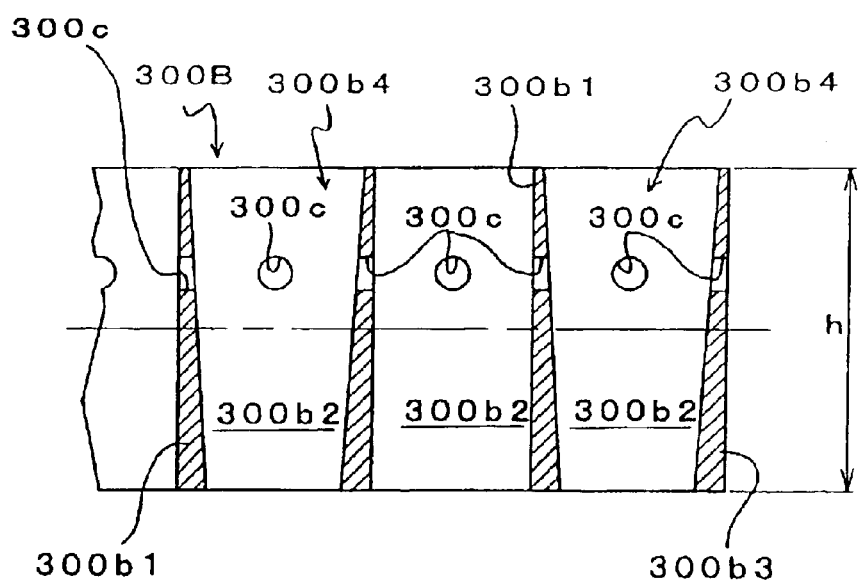
FIG. 12 is a sectional view along the line II—II of FIG. 11.

When a predetermined time passes after a finish of filling the material, the frame bodies are removed to separate the first mold (lower mold) and second mold upper mold. At this time, an article formed in the mold remains in the first mold side having more protrusions (FIG. 12). The second protrusion of the second mold is provided with the drawing gradient on the side to thereby allow the product to be easily stripped from a cavity surface, and can be neatly drawn from the product.

Next, a using manner of the cushion with an air vent provided in a side wall according to the third invention will be described.

As described above, the cushion made of the thermoplastic elastomer formed as described above is used as a cushion for a bed, chair, sofa, or the like with a cover, and for a large article such as a bed, as described later, the cushions are vertically and horizontally arranged to be integrated by adhesion or a stapler for use as a bed cushion.

The cushion formed substantially in a lattice on plan view includes a vertical or horizontal diaphragm or side wall. The diaphragms or side wall arranged in the lattice are buckled when the user's weight is applied to function as a cushion with high elasticity.

Specifically, the diaphragms or side wall are formed to have tapered sections so as to be thinner at upper edges than lower edges of the diaphragms, so that bending of the diaphragms or side wall to be contact surfaces of the cushion 300B is gradually reduced from a lower side to the upper edge, and flexible deformability can be achieved at the upper edge.

The diaphragms or side wall are elastically deformed satisfactorily by providing the air vent in a predetermined position. The air vent is essentially a hole for ventilation inside the lattice, but concerns an elastic deformation property of the diaphragms or side wall.

Injection noise of air occurs partly resulting from the diaphragms or side wall being drastically bent. As described above, however, the air vents are provided in the diaphragm or side wall to thereby soften the areas. That is, when the user's load is applied, the air vent is deformed to be enlarged or to be an ellipse, thereby relieving drastic bending caused by the load.

Thus, for the cushion 300B including the diaphragm or side wall, the upper edges that are the softest are elastically bent and deformed to achieve soft feeling of touch in an initial state where the user 300A touches the contact surface, the diaphragm or side wall start to be bent from the areas of the air vent as the user's weight is applied, and a central portion is buckled to be appropriately elastically deformed. This allows the cushion to achieve soft cushioning like a tip of a brush without feeling of touching a bottom or partial protrusions.

Next, a cushion having partition lines formed therein and a using manner of its mold will be described.

With the first mold (lower mold) and second mold (upper mold) fitted, frame bodies forming an outer frame are abutted against four peripheral surfaces of the substrates to form an outer frame of square shape on plan view.

Accordingly, when the first and second molds, and frame bodies configured as described above are fitted, a gap for forming a lattice-like cushion, that is, a cavity is formed between each coupled article of the middle protrusion of the first mold and the space keeping protrusion of the second mold and each protrusion 402b of the second mold 402. As described above, after the mold are fitted, a material made of thermoplastic elastomer is charged into the cavity, which is filled therewith. Each protrusion of the second mold is provided with a slight drawing gradient toward a protruded end so as to facilitate stripping the product formed in the cavity 404 from a surface of the cavity. Therefore, a drawing gradient of the protrusion is set in such a manner that the cushion formed in the cavity 404 remain in the first mold that has relatively higher adhesion by separation of the first and second molds and the frame bodies.

After separation of the mold, a worker removes the cushion remaining in the first mold. At this time, the cushion remaining in the first mold is formed with an opening that is formed after drawing of the space keeping protrusion together with a hollow portion of a lattice formed by the protrusion of the second mold.

In the cushion drawn from the first mold, a partition line is formed on the diaphragm, the partition line representing a ratio of a height between the space keeping protrusion of the second mold and the middle protrusion of the first mold. Thus, the diaphragms are buckled at the partition line when load of the user is applied on the cushion, thereby causing no feeling of touching a bottom, and having flexibility.

In the present invention, for the bed cushion having a structure where thin and vertical diaphragms are arranged in a lattice, the diaphragms are made of elastomer having Shore A hardness of 20 to 40, so that the diaphragms are buckled when load is applied, thereby causing no feeling of touching a bottom, and having flexibility, high absorption of light load. Further, the resilience reinforcing agent such as hydrozincite is mixed into the elastomer, so that meritorious effects of high resilience and high durability to flattening can be achieved.

Next, embodiments of the invention of the present application will be described with reference to FIGS. 2 to 10.

Figure 2:
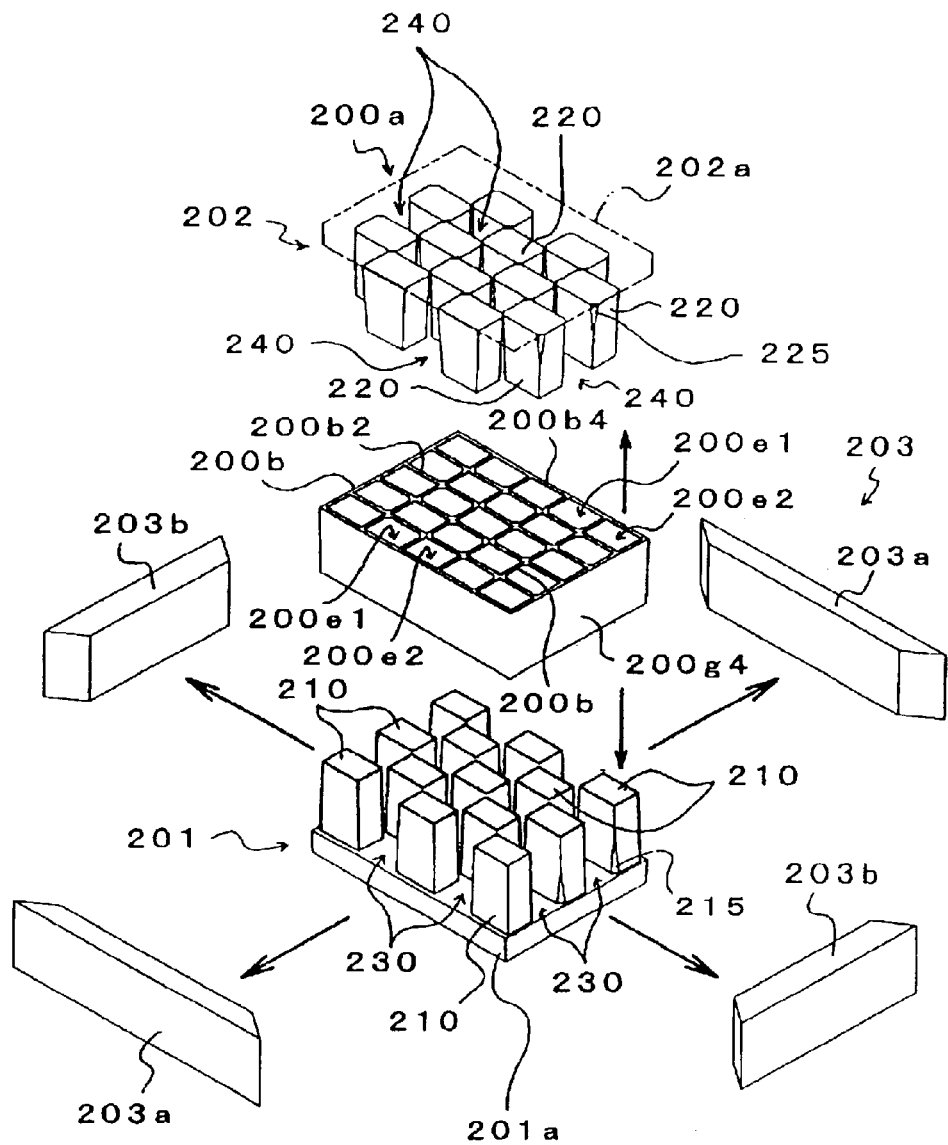
FIG. 2 is an exploded view of a mold for a cushion and a product according to a second invention of the present application.
Figure 3:
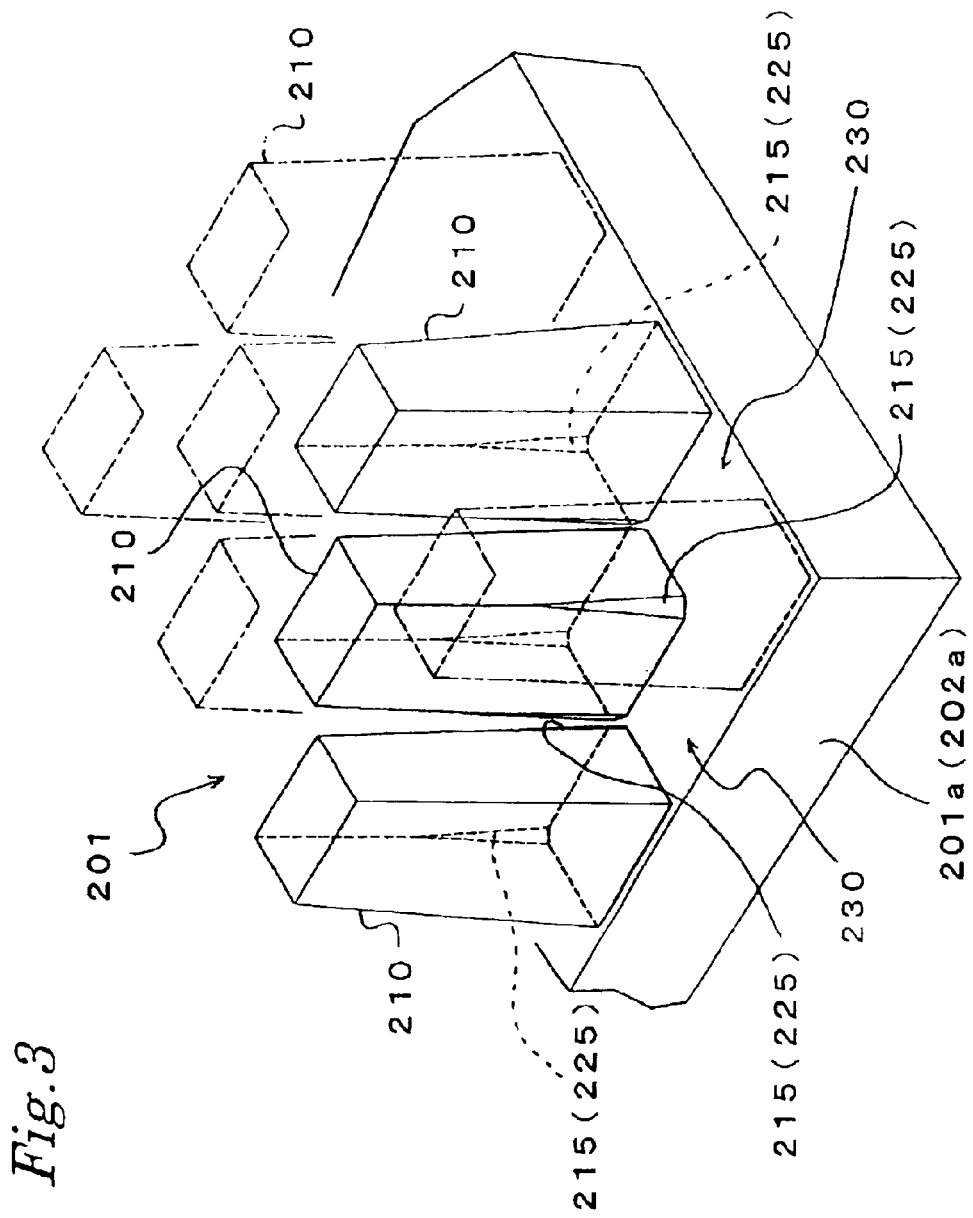
FIG. 3 is a perspective view, partly omitted, of a first mold and a second mold of the present invention.

FIG. 2 and FIG. 3 show a mold a for a cushion in a second example that embodies the present invention.

A mold 200a includes a first mold 201 to be a lower mold, a second mold 202 to be an upper mold, and an outer frame mold 203 to be fitted so as to surround four peripheral surfaces of both the fitted first and second molds.

The cushion 200b formed by the mold 200a is integrally formed using elastomer, thin and horizontal diaphragms 200b1 and vertical diaphragms 200b2 are arranged in a lattice on plan view, and peripheries thereof are surrounded by an outer side wall 200b4. In each lattice, relatively large openings 200e1 and somewhat smaller openings 200e2 with chamfered corners are arranged like a checkerboard. Communication diaphragms 200b3 corresponding to the common chamfered portions provided on edges of the openings e1 are formed between the common corners of the openings 200e1. The communication diaphragm 200b3 provides communications between corners of the diaphragms 200b1, 200b2 surrounding the smaller openings 200e2.

The first mold 201 of the mold 200a has a predetermined number of first protrusions 210 integrally formed vertically and horizontally in a protruding manner on an upper surface of a substrate 201 a of rectangular shape on plan view through spaces to be inserting portions 230. The first protrusions 210 and inserting portions 230 are arranged like a checkerboard on plan view (FIG. 2).

On the other hand, the second mold 202 has a predetermined number of second protrusions 220 integrally formed vertically and horizontally on a lower surface of a substrate 202a through spaces to be inserting portions 240. The inserting portions 240 and the second protrusions 220 are arranged like a checkerboard on plan view like the case of the first mold 201.

Positional relationship between the first protrusion 210 of the first mold 201 and inserting portion 230, and positional relationship between the second protrusion 220 of the second mold 202 and the inserting portion 240 are opposite to each other. Thus, when the molds are fitted, each first protrusion 210 of the first mold 201 is inserted in each inserting portion 240 of the second mold, and simultaneously, each second protrusion 220 of the second mold 202 is inserted in the inserting portion 230 of the first mold 201 (FIG. 7).

The first protrusion 210 of the first mold 201 and the second protrusion 220 of the second mold 202 are identically formed. That is, the first protrusion 210 of the first mold 201 is formed in a protruding manner in a square prism from a surface of the substrate 201a. The first protrusion 210 is adapted to be inserted, at its tip surface, in the inserting portion 240 of the second mold 202 when the molds are fitted in such a manner that the tip surface abuts against the surface of the substrate 202a of the second mold 202. Similarly, when the molds are fitted, the second protrusion 220 of the second mold 202 is inserted in the inserting portion 230 of the first mold 201 and abuts against the surface of the substrate 201a (FIG. 8).

Figure 6:
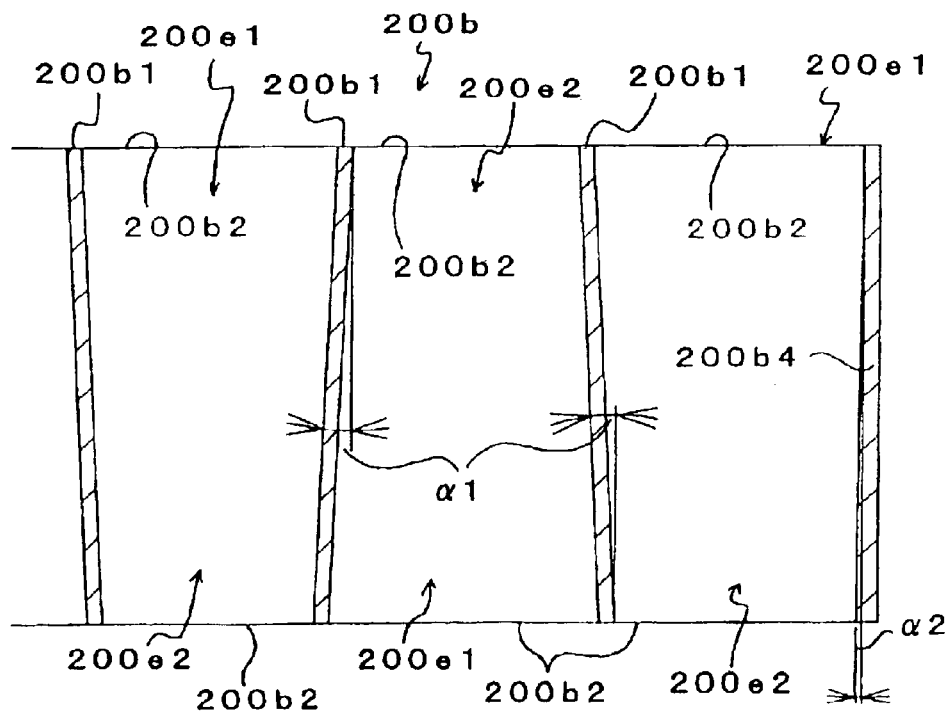
FIG. 6 is a sectional view along the line V—V of FIG. 5.

The first protrusion 210 of the first mold has a predetermined gradient on its side surface, and for example, a gradient α1 of 2.37° in this embodiment, and is tapered to have somewhat a smaller contour at the tip than a base of the first protrusion 210. This also applies to the second protrusion 220, and is tapered toward the tip on side view (FIG. 6).

Figure 7:
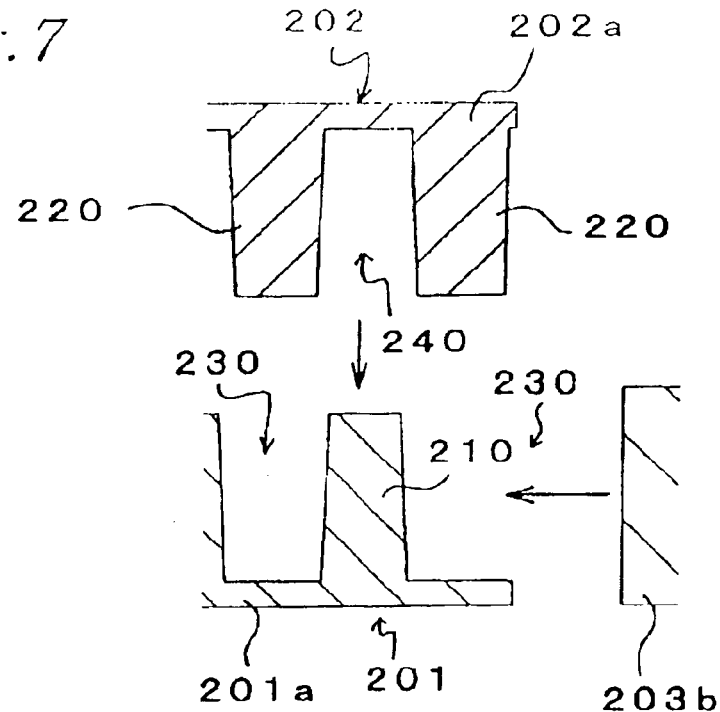
FIG. 7 is a vertical sectional view of a dismantled mold.
Figure 8:
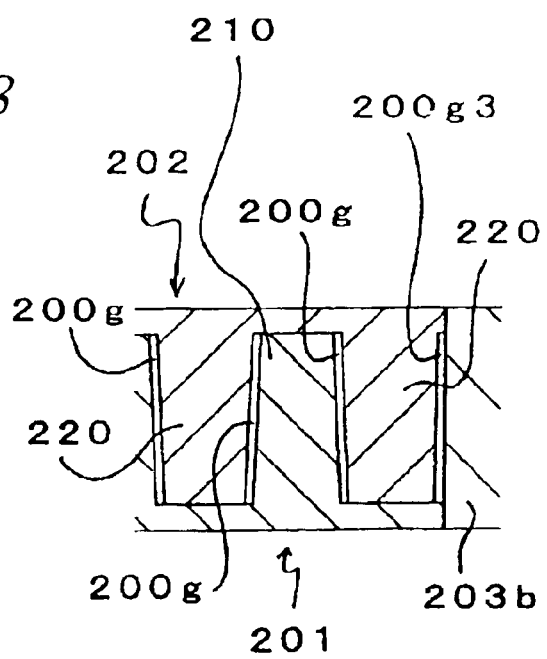
FIG. 8 is a vertical sectional view of the first and second molds and an outer frame being fitted.

Specifically, the first and second protrusions 210, 220 with gradients are inserted in the inserting portions 230, 240 of the first and second molds 201, 202 with shapes thereof substantially matched in a fitted state as shown in FIGS. 7 and 8 to be fitted to each other with gaps 200 g left to be cavities for forming lattice-like diaphragms 200b1, 200b2 between the first and second protrusions 210, 220.

The respective corners at the bases of the first protrusion 210 and second protrusion 220 of the first and second molds 201, 202 are formed with respective chamfered portions 215, 225 chamfered to vertically rise up from the surfaces of the substrates 201a, 202a, and in a fitted state, gaps 200g3 to be cavities for forming the communication diaphragms 200b3 are formed between the chamfered portions 215 and between the chamfered portions 225, respectively. The chamfered portions 215, 225 are not formed at areas making contact with the outer frame 203 (FIGS. 2 to 5).

Figure 9:
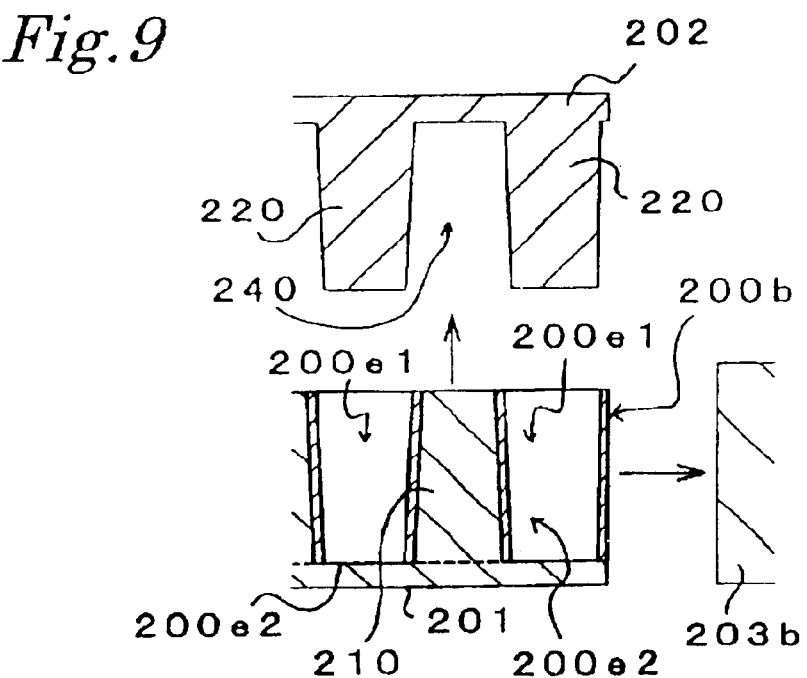
FIG. 9 is a vertical sectional view of elastomer being injected into a cavity by the mold and then the mold being dismantled to remove the product from the mold.
Figure 11:
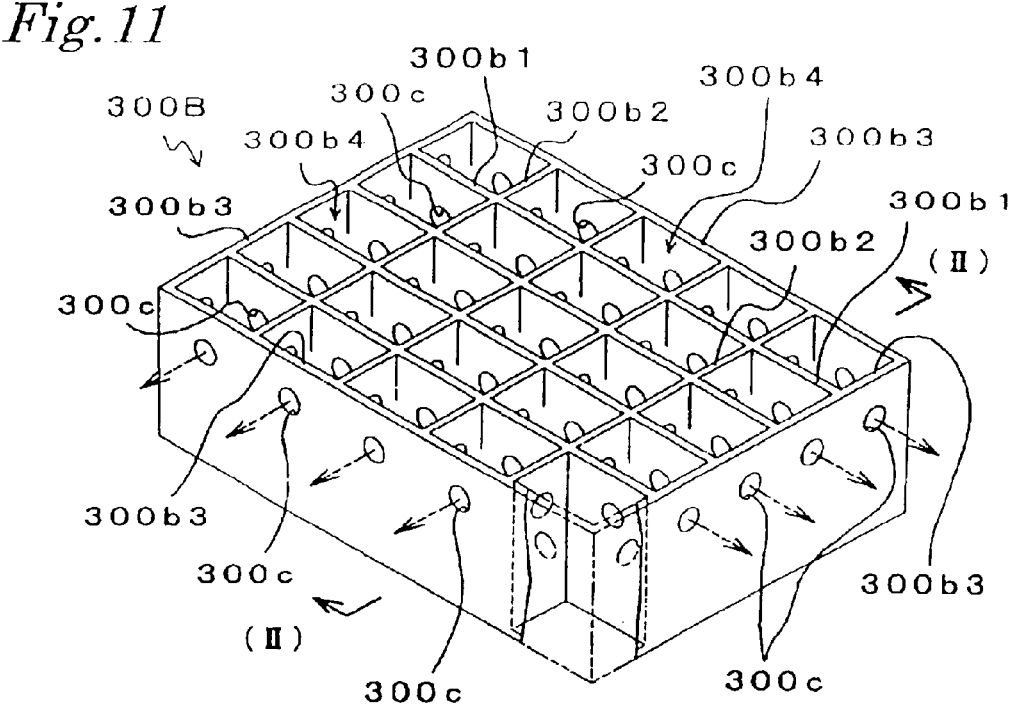
FIG. 11 is a perspective view, partly notched, of a cushion with an air vent provided in a diaphragm according to another embodiment of the invention of the present application.

When the first mold 210 and second mold 220 are fitted, the first protrusion 210 and second protrusion 220 arranged alternately like a checkerboard are respectively inserted in the inserting portions 240, 230 of the other molds, and tip surfaces of the first protrusion 201 and second protrusion 202 respectively abut against the substrates 202a, 201a of the other molds (FIG. 9, FIG. 11).

As described above, after the first and second molds 201, 202 are fitted, frame bodies 203a, 203b forming the outer frame 3 are abutted against four peripheral surfaces of the substrates 201a, 202a to form the outer frame 203 of square shape on plan view.

Accordingly, when the first and second molds 201, 202 and the frame bodies 203a, 203b configured as described above are fitted, gaps 200g, 200g3 are formed along the outer frame 203 between the first protrusions 210 of the first mold 201, and between the second protrusions 220 of the second mold 202 between chambered portions 215, 225, and between the first protrusion 210 and second protrusion 220 along the outer frame 203 as shown in FIGS. 8 and 9.

For the gap 200g formed along an inner surface of the outer frame 203, a gap on the larger opening 200e1 side is formed to be thinner than the smaller opening 200e2, and a minute drawing gradient, for example, a drawing gradient α2 on the order of 0.38° is formed on the side surface to improve removability (FIG. 6, FIG. 8).

After the molds are fitted, a material made of thermoplastic elastomer is charged into the gaps 200g, 200g3 to be cavities, and the cavities are filled therewith (FIG. 8). The elastomer used in the present invention has been described in detail, but thermoplastic elastomer is preferable in terms of recyclability and workability. Specifically, thermoplastic elastomers of styrene base, polyurethane base, polyolefin base, polyvinyl chloride base, polyester base, or polyamide base, or the like are used.

When a predetermined time passes after a finish of filling the material, the frame bodies of the outer frames 203a, 203b are removed to separate the first and second molds 201, 202. At this time, a structure formed in the mold remains in the first mold 1 side having more protrusions (FIG. 9). Toward the base of the second protrusion 220 of the second mold 202 there is provided with the drawing gradient on the side to thereby allow the structure to be easily stripped from a cavity surface, and can be neatly drawn from the structure.

After the mold 200a is separated and the second mold 202 is drawn, a worker removes the cushion 200b remaining in the first mold 201. At this time, in the cushion 200b remaining in the first mold 201, the lattice formed by the first protrusion 210 of the first mold 201 and the base of the second mold 202 forms the larger opening 200e1, and the lattice formed by the tip thereof forms the smaller opening 200e2.

Therefore, when removing the cushion 200b from the first mold 201, the worker picks an opening edge of the small opening 200e2 and successively strips attached portions between the surfaces of the first protrusions 210 and the diaphragms 200b1 and 200b2, the communication diaphragms 200b3 and 200b4 of the cushion 200b to remove the cushion 2002b from the mold. This removal operation can be easily carried out since it can be effected while picking the opening edge of the small opening 200e2.

As described above, when the cushion 200b is removed from the first mold 201, the diaphragms 200b1, 200b2 of the cushion 200b can be smoothly removed from the mold without attachment or blocking of the product due to drawing gradients α1 provided on the side surfaces of the first and second molds 201, 202.

Especially, in the cushion 200b, the corners of the opening 200e1 at the bases of the first protrusion 210 and the second protrusion 220 that are likely to cause attachment are provided with the chamfered portions 215, 225 to have obtuse angles, so that separation of the fitted first and second molds 201, 202 or removal of the cushion 200b remaining in the first mold 201 can be carried out more smoothly.

Thus, the mold 200a for a cushion allows the thin and substantially lattice-like diaphragms 200b1, 200b2 of cushion 200b formed in the cavity to be neatly and smoothly removed without attachment or blocking trace.

Figure 4:
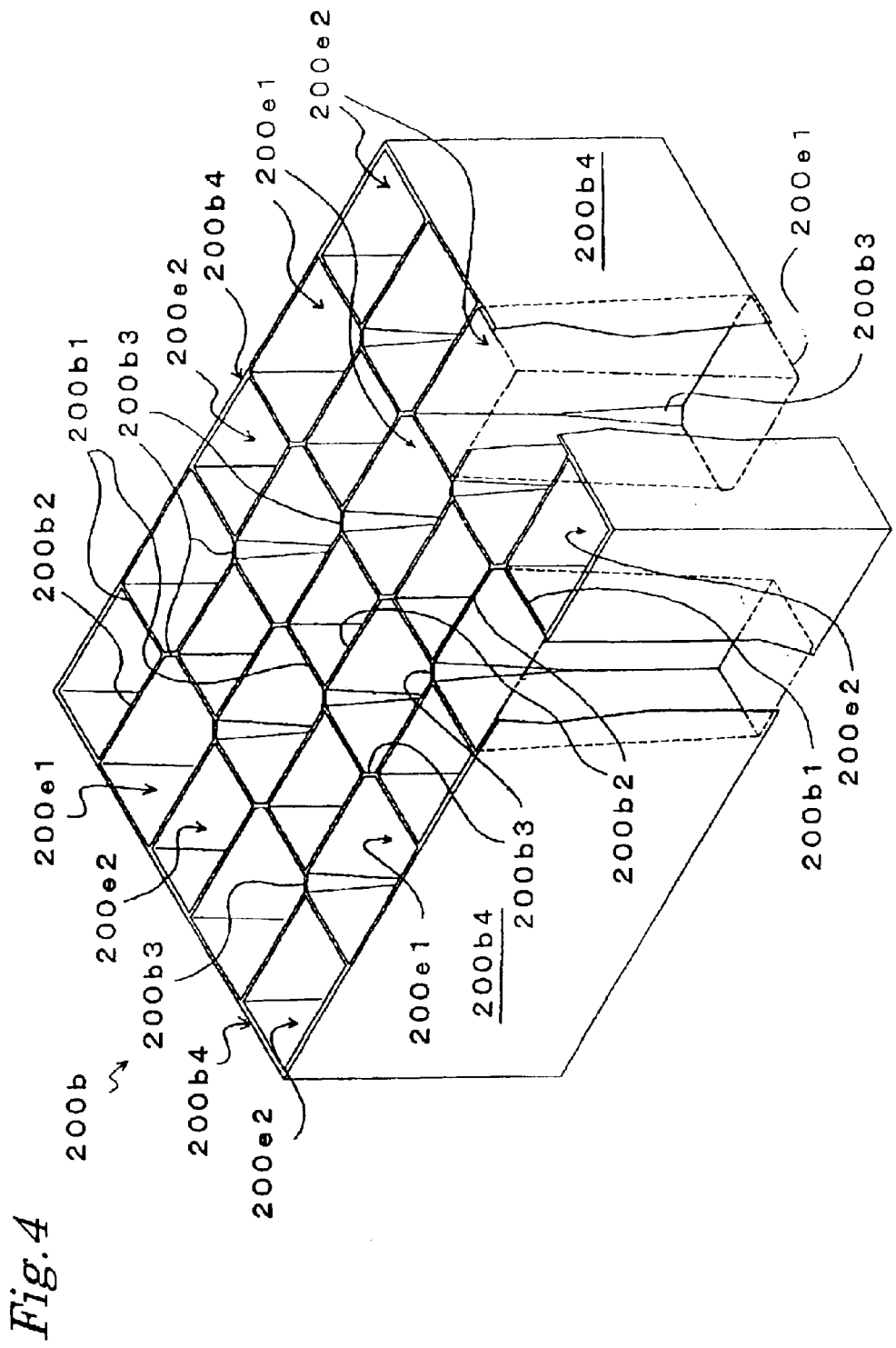
FIG. 4 is a perspective view, partly notched, of the cushion molded be the molds of FIG. 3.
Figure 5:
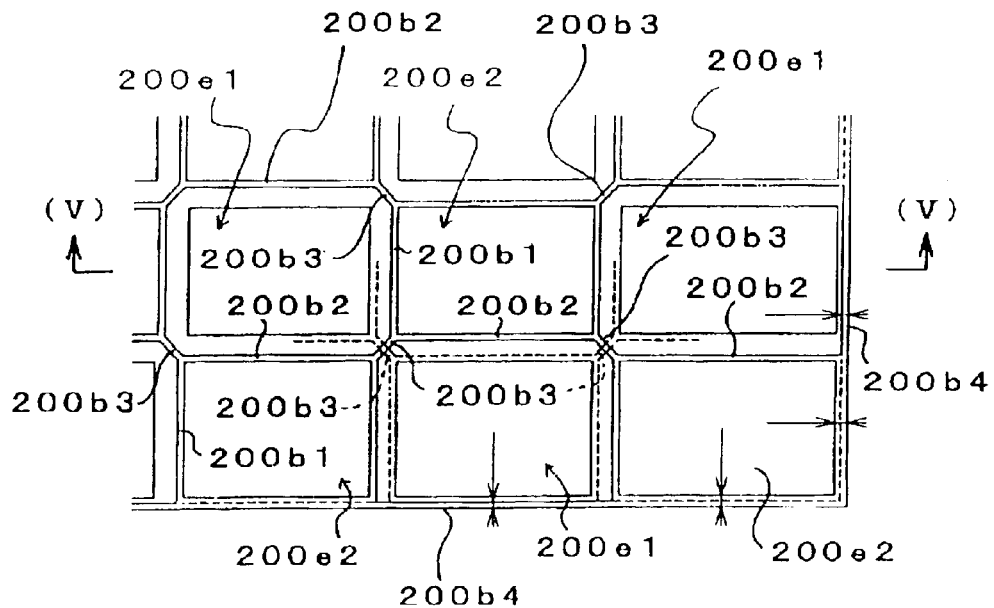
FIG. 5 is a plan view of a corner of the cushion of FIG. 4.

As described above, the cushion 200b formed by the mold 200a has the thin diaphragms 200b, 200b2, and the side wall 200b4 arranged in a lattice on plan view, and the openings 200e1 and relatively smaller openings 200e2 are arranged like a checkerboard (FIG. 4, FIG. 5).

Also, the communication diaphragms 200b3 of the larger openings 200e1 formed by the chamfered portions 215, 225 provided on the first and second protrusions 210, 220 are formed such that the corners of the adjacent smaller openings 200e2 communicate with each other through the communication diaphragms 200b3. The communication diaphragm 200b3 is formed in a vertical isosceles triangle on side view, and formed like the corner of the larger opening 200e1 by an upper half and a lower half of the cushion 200b. The communication diaphragm 200b3 changes an angle to 90° at the center of the cushion 200b along the thickness, that is, at half of the height of the diaphragms 200b1 and 200b2, and is adapted to cross substantially in an X shape on plan view (FIG. 4, FIG. 5).

As described above, providing the communication diaphragm 200b3 causes the corner of the opening 200e1 to have an obtuse angle, thereby preventing attachment of the product during removal from the mold.

In the area where the corners of the openings 200e1 and 200e2 come close to each other, the corners of the opening 200e2 are adapted to make contact with each other by the communication diaphragm 200b3.

The cushion 200b has a lattice formed by combination of octagons and squares, and when seen from the rear, the octagon on the surface corresponds to the square on the rear, and the square on the surface corresponds to the octagon on the rear. Thus, crossing portions on the surface of the diaphragm are eliminated unlike the conventional cushion, thereby preventing disadvantage of increased bounce partially generated in the crossing portion between the diaphragms of the cushion 200b.

The inside is also provided with a crossing portion of the diaphragms, which presents satisfactory pressure distribution. Thus, the cushion 200b presents satisfactory cushioning.

The cushion 200b formed substantially in a lattice on plan view includes horizontal and vertical diaphragms 200b, 200b2, side wall 200b4, and communication diaphragm 200b3. The diaphragms 200b, 200b2, and side wall 200b4 arranged in the lattice are buckled when the use's weight is applied to function as a cushion.

Figure 10:
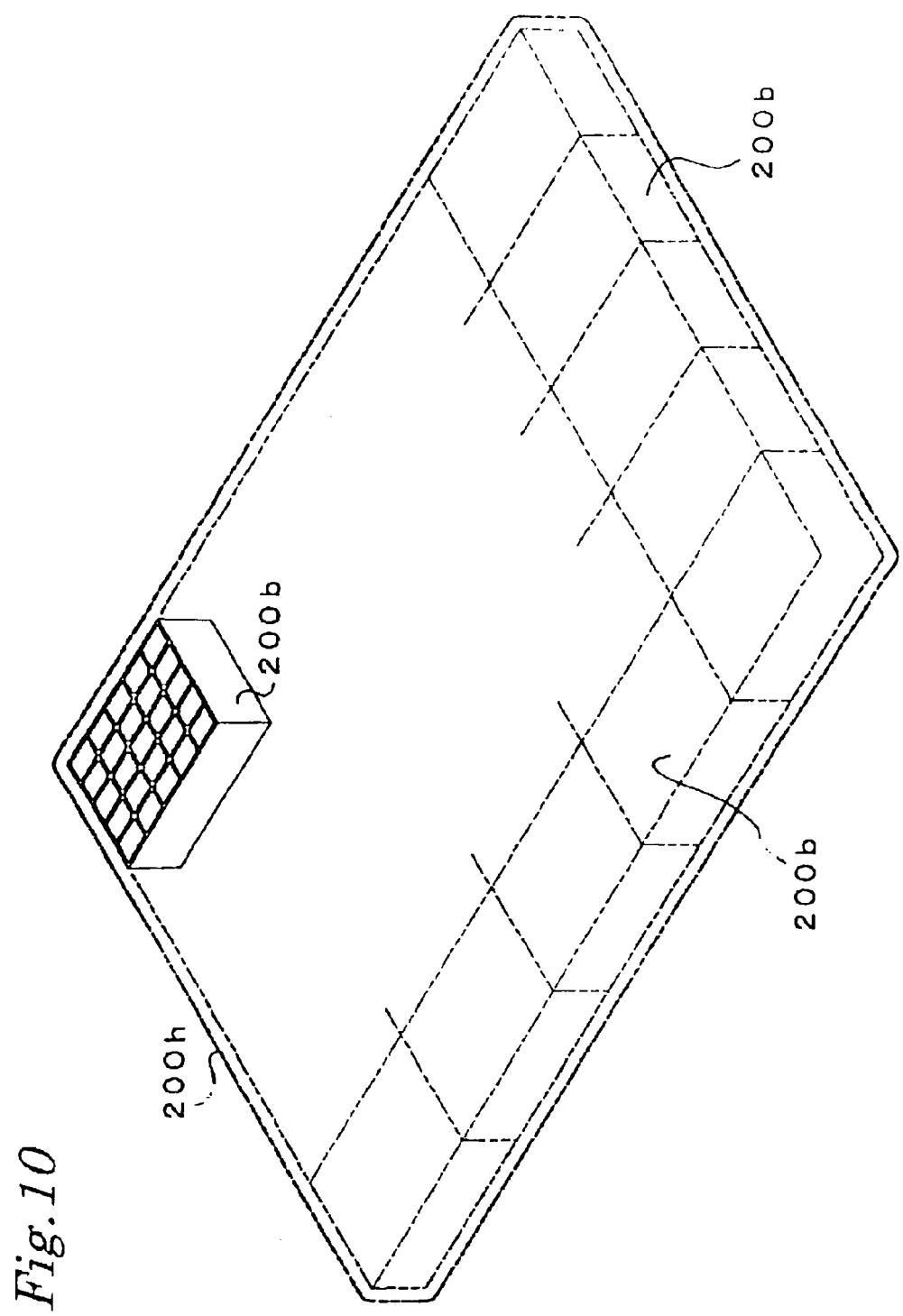
FIG. 10 is a perspective view of a bed with the cushions vertically and horizontally arranged.

The cushion 200b is used as a cushion for a bed, a chair, a sofa, or the like, and for a large article such as a bed, the cushions 200b are vertically and horizontally arranged to be integrated by adhesion or a stapler to form a bed 200h as shown in FIG. 10.

When vertically and horizontally arranging the cushion 200b to form a bed surface, arranging as pairs the cushions 200b with the upper and lower surfaces of the adjacent cushions 200b alternate causes thick portions and thin portions of the peripheral side wall 200b4 to be alternately arranged, thereby achieving uniform elasticity on the bed surface without poor thickness uniformity of the side wall 200b4.

The elastomer used in the present invention has Shore A hardness of 10 to 40, preferably 15 to 35. When the elastomer having the above described hardness is used for diaphragms for a bed cushion for a structure where thin and vertical diaphragms are arranged in a lattice, the diaphragms are deformed so as to be buckled when load is applied. Therefore, the cushion causes no feeling of touching a bottom, and has flexibility, high absorption of light load. It also has high durability.

The second embodiment of the present invention of the application achieves effects as described below.

The cushion 200b with thin and vertical diaphragms 200b, 200b2 arranged in the lattice can be formed using the mold for a cushion 200a by injecting a semirigid material such as the thermoplastic elastomer into the cavity with the first and second molds 201, 202 and the outer frame mold 203 being fitted.

After the cushion 200b is formed, dismantling the outer frame mold 203 and the first and second molds 201, 202 causes the cushion to remain fitted in the protrusions (the first protrusions 210 or the second protrusions 220) of one of the first and second molds 201, 202, and each protrusion of the other mold is simultaneously drawn. Then, the cushion 200b remaining in one mold can be easily removed from the mold by picking the edges of the openings formed by drawing the protrusions of the other mold to strip and draw the cushion from the cavity surface.

Specifically, in the mold of the second embodiment, the opening of the cushion is tapered toward the opening at the base by the drawing gradient provided on the side, thereby allowing the cushion as the structure to be smoothly and neatly removed from the mold without attachment or blocking in removal.

Especially, in the cushion 200b, the corners of the opening at the bases of the first protrusion 210 and the second protrusion 220 are formed with the chamfered portions to have obtuse angles, thereby allowing more smooth removal.

Moreover, improvement in removability can increase height of formable cushion, which permits forming a thick cushion, highly setting a stroke of the cushion, and improving elastic touch.

A cushion is made of elastomer by the mold with thin diaphragms arranged in a lattice, so that the diaphragms are appropriately buckled when load is applied on the cushion, thereby causing no feeling of touching a bottom, having flexibility, and especially having satisfactory absorption of light load.

Therefore, by prevention of touching the bottom or equal distribution of pressure, the cushion can be used for a chair or a sofa as well as a normal bed, and is ideal for use in a bed for preventing bedsore.

A cushion described can be widely used for a bed, a chair, a seat of an automobile, or the like, particularly when the elastomer is a styrene based elastomer which maintains satisfactory flexibility and improves durability.

A cushion described in claim 4 has especially excellent flexibility like a water bed, when the cushion is formed using gel made by adding a softener to the elastomer as a cushion formed by the mold for a cushion. Further, the cushion has satisfactory absorption of light load, and is therefore suitable for use, for example, in a bed for preventing bedsore.

Next, an embodiment of a third invention of the present application will be described.

A cushion 300B shown in FIG. 11 and FIG. 12 is integrally formed using elastomer, and thin and horizontal diaphragm 300b2 and side wall 300b1 are arranged in a lattice on plan view, and peripheries thereof are integrally formed to be surrounded by a diaphragm 303b3.

Air vents 300c are respectively drilled in the vertical and horizontal diaphragm 300b, 300b2 and peripheral side wall 300b3, and spaces in the respective lattices surrounded by the vertical diaphragm 300b, horizontal diaphragm 300b2, and side wall 300b3 communicate. This permits air to freely pass through the air vents 200c.

Figure 16:
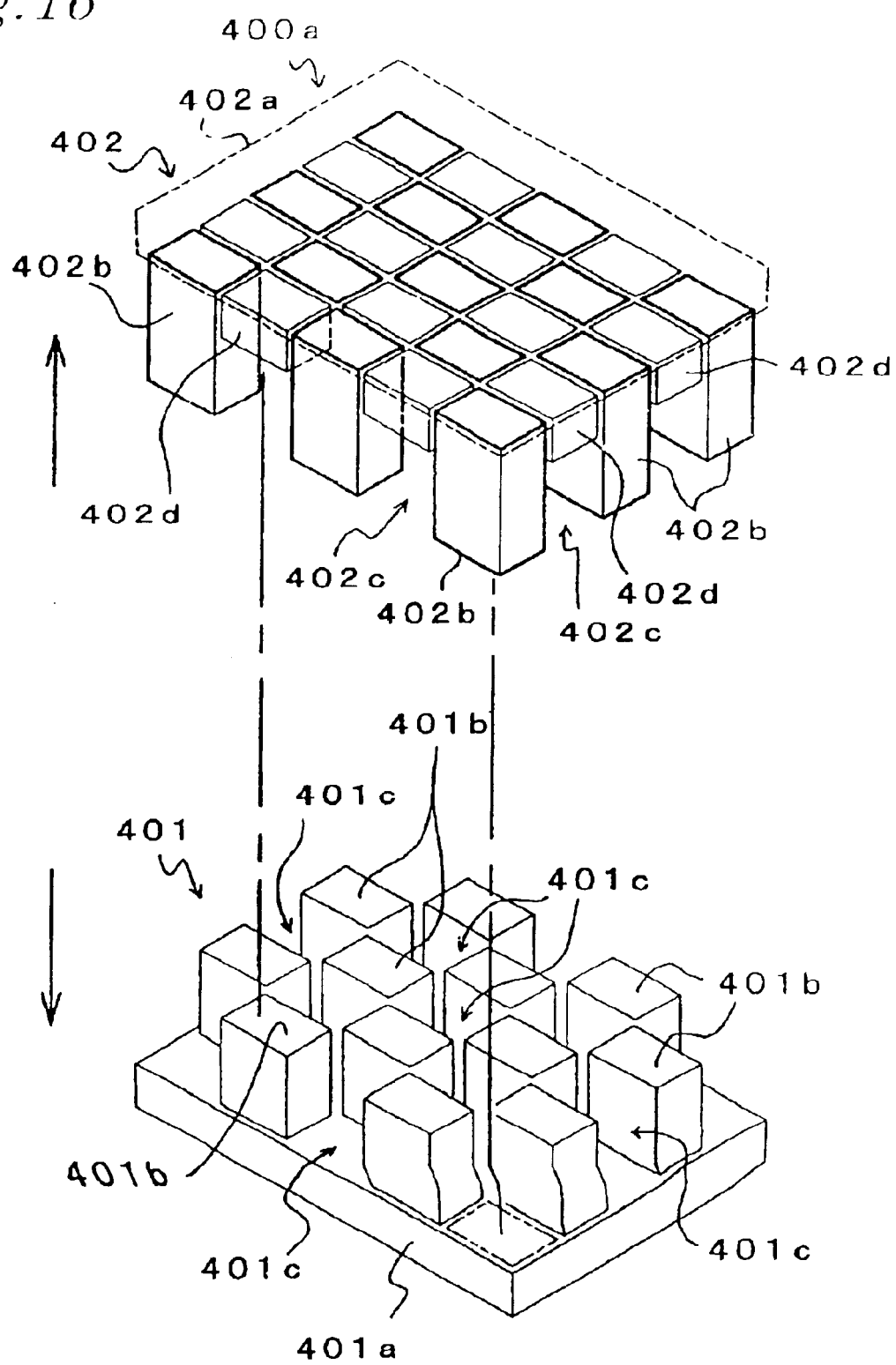
FIG. 16 is a perspective view, partly omitted, of a first mold and a second mold according to another embodiment the invention of the present application.

The cushion 300B is assembled as shown in FIG. 16 and integrally formed using a mold 300d that can be dismantled.

Figure 19:
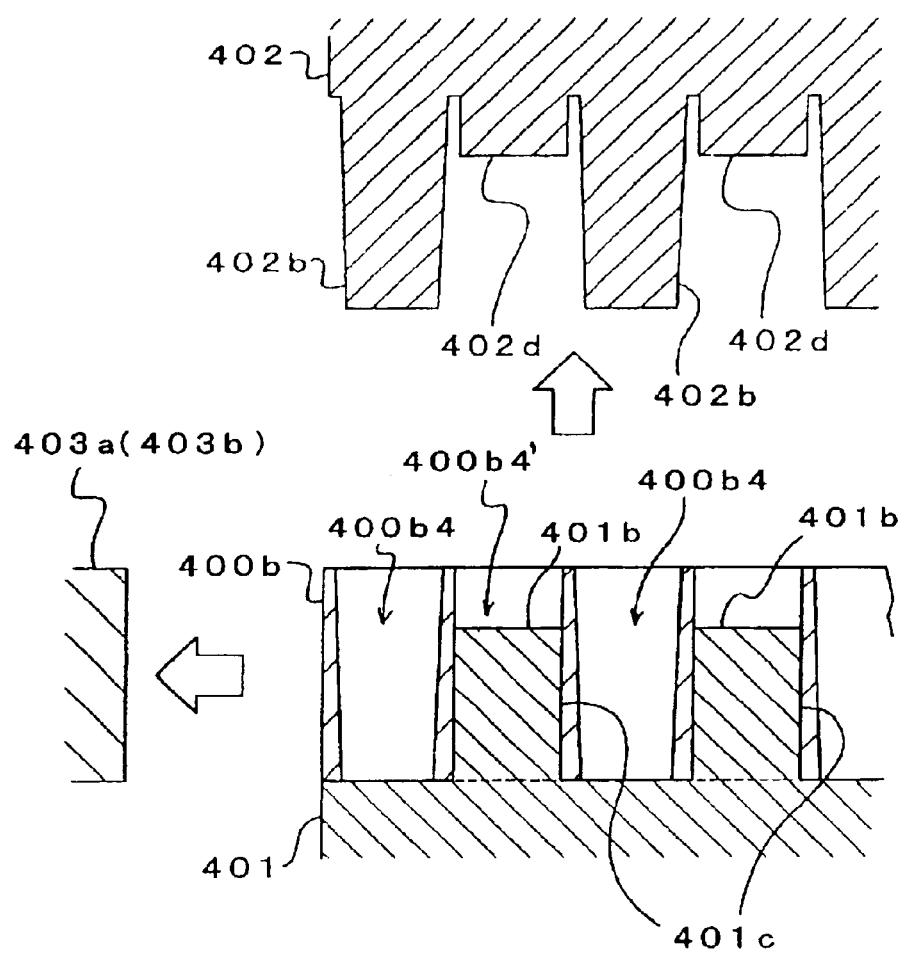
FIG. 19 is a vertical sectional view of the mold being opened.
Figure 20:
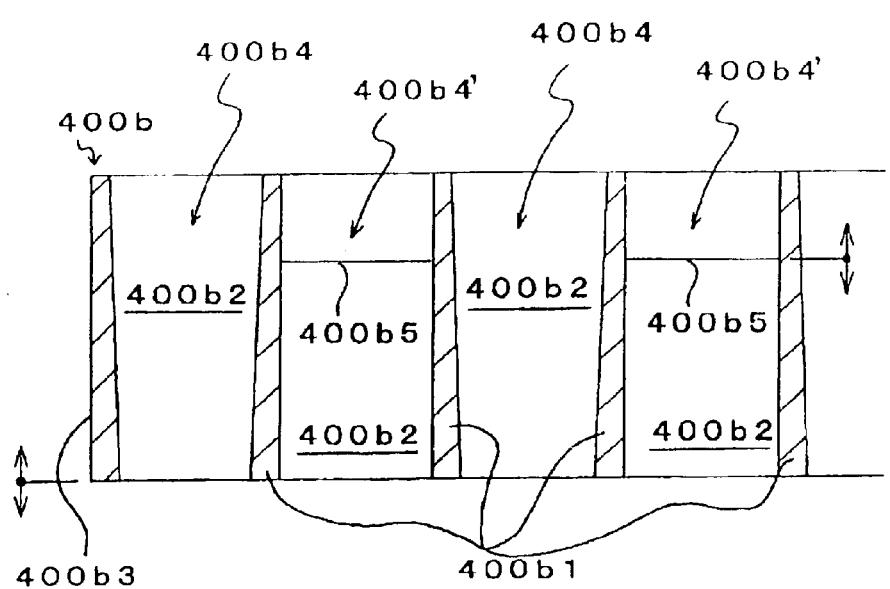
FIG. 20 is a vertical sectional view of a cushion formed by the mold.

As described above, the cushion 300B made of the thermoplastic elastomer formed as described above is used as a cushion for a bed, chair, sofa, or the like with a cover 300D (FIG. 13), and for a large article such as a bed, as described later, the cushions 300B are vertically and horizontally arranged to be integrated by adhesion or a stapler for use as a bed cushion (FIG. 19, FIG. 20).

The cushion 300B formed substantially in a lattice on plan view includes vertical and horizontal diaphragms 300b, 300b2, and side wall 300b3. The diaphragms 300b, 300b2, 300b3 arranged in the lattice are buckled when the user's weight is applied to function as a cushion with high elasticity.

Specifically, the vertical and horizontal diaphragms 300b, 300b2, and side wall 300b3 are formed to have tapered sections so as to be thinner at upper edges than lower edges (FIG. 12), so that bending of the vertical diaphragm 300b, horizontal 300b2, and side wall 300b3 to be contact surfaces of the cushion 300B is gradually reduced from a lower edge to the upper edge, and flexible deformability can be achieved at the upper edge.

The vertical and horizontal diaphragms 300b, 300b2 and side wall 300b3 are elastically deformed satisfactorily in an improved way by providing the air vent 300c in its predetermined position. The air vent 300c is essentially a hole for ventilation for the space inside the lattice, but also concerns an elastic deformation property of the vertical and horizontal diaphragms 300b, 300b2, and side wall 300b3.

Injection noise of air occurs partly resulting from the vertical and horizontal diaphragms 300b1, 300b2, and side wall 300b3 being drastically bent. As described above, however, the air vents 300c are provided in the vertical and horizontal diaphragm 300b1, 300b2, and wide wall 300b3 to thereby soften the areas. That is, when the user's weight is applied, the air vent 300c is deformed to be enlarged or to be an ellipse, for example, thereby relieving drastic bending caused by the load.

Figure 17:
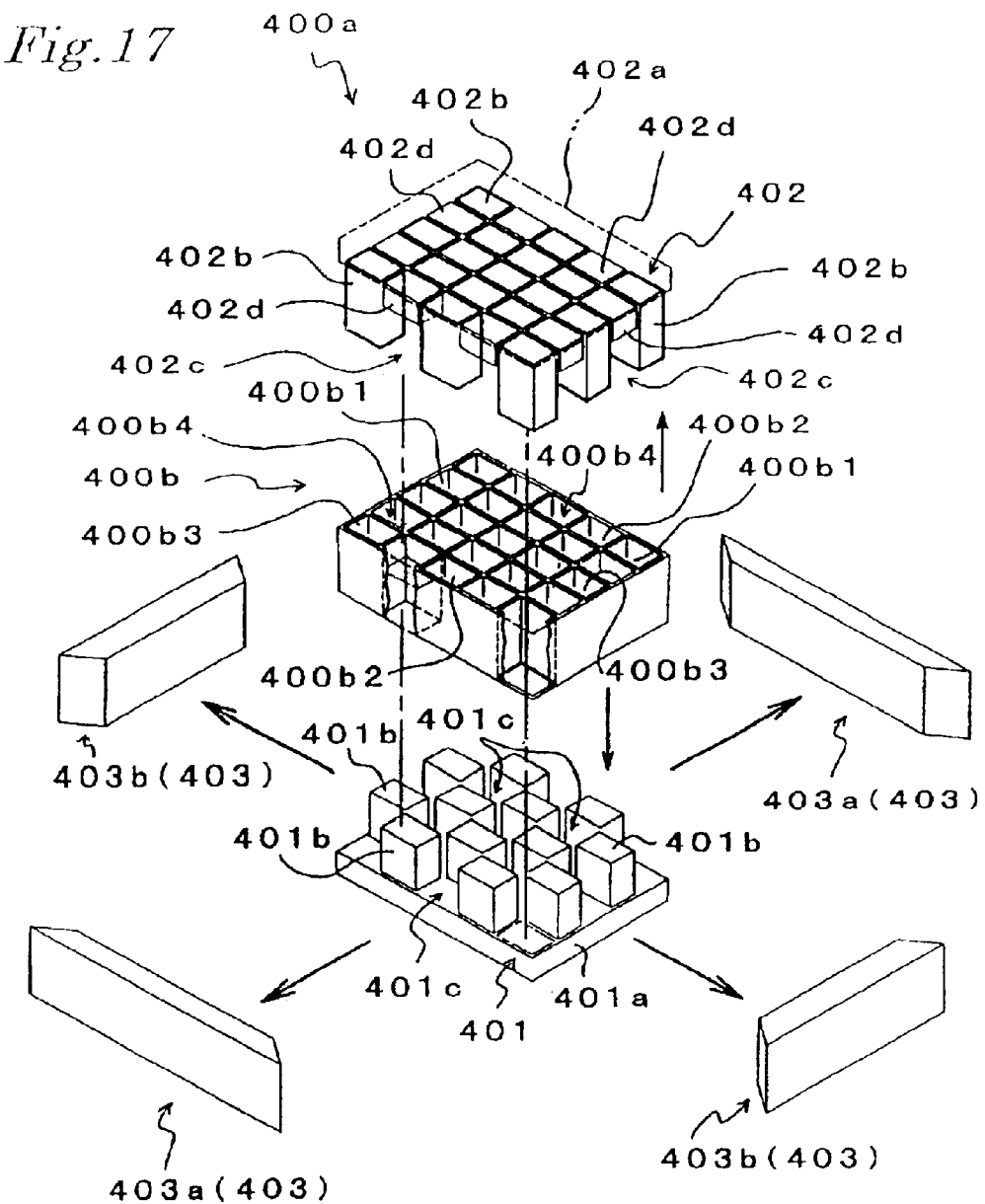
FIG. 17 is an exploded view of a mold for a cushion according to the invention of the present application.
Figure 18:
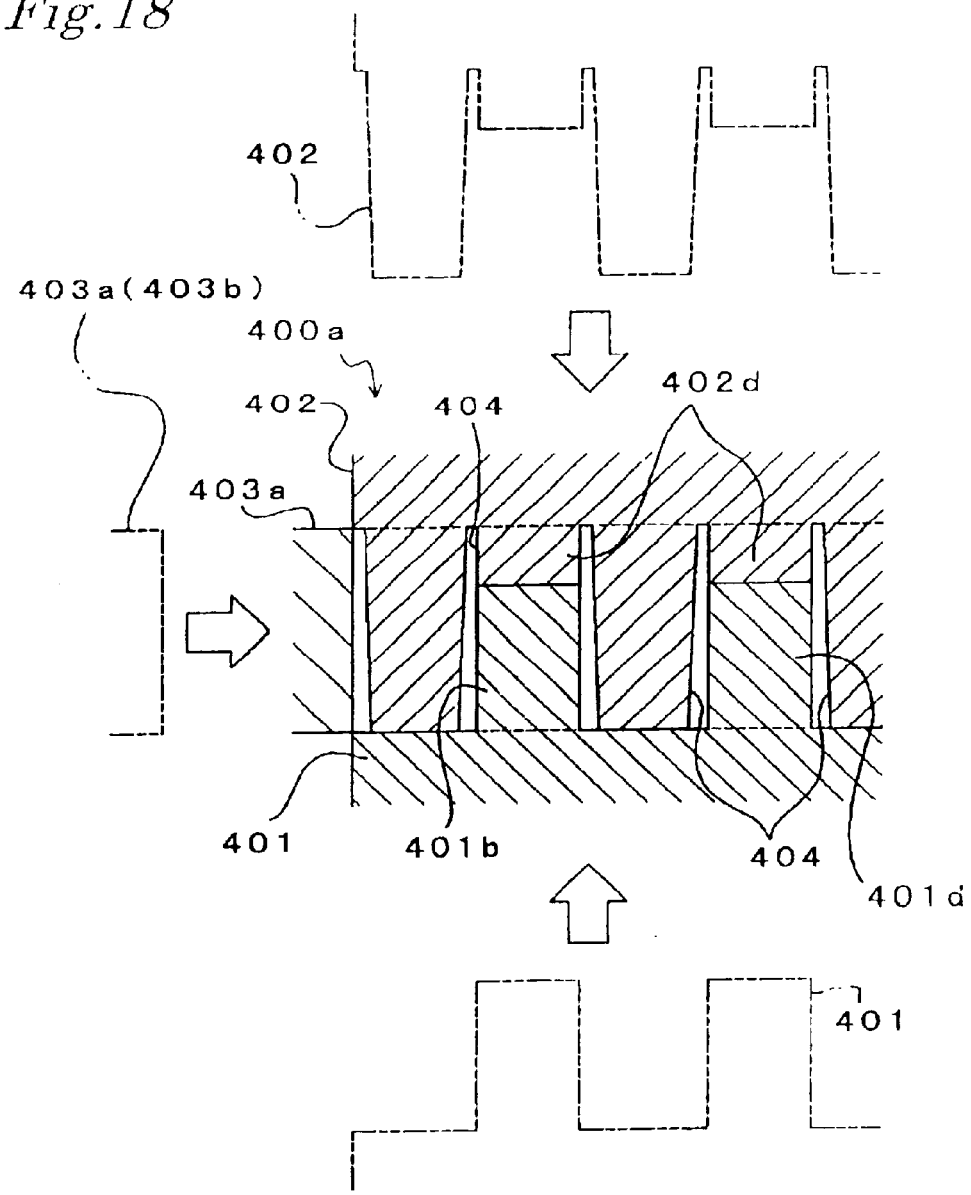
FIG. 18 is a vertical sectional view of the mold of FIG. 17 being fitted.

A condition for obtaining satisfactory elastic deformation is that the air vent 300c is provided in each of the vertical and horizontal diaphragms 300b1, 300b2, and side wall 300b3 at a position ranging from 60% to 80% of the height h, and in this embodiment, one air vent 300c is provided at the position of 70% of the height h for each diaphragm (FIG. 17, FIG. 18).

A diameter of the air vent 300c is an important factor of satisfactory elastic deformation as well as a location. The size of the air vent is set within a range of 3 to 10 cm square to thereby maintain a sufficient venting function and provide the vertical and horizontal diaphragms 300b1, 300b2, side wall 300b3 with a satisfactory elastic deformation property. The air vent can be formed into any shape, but a circular shape is preferable for natural elastic deformation of the diaphragms and side wall.

Figure 13:
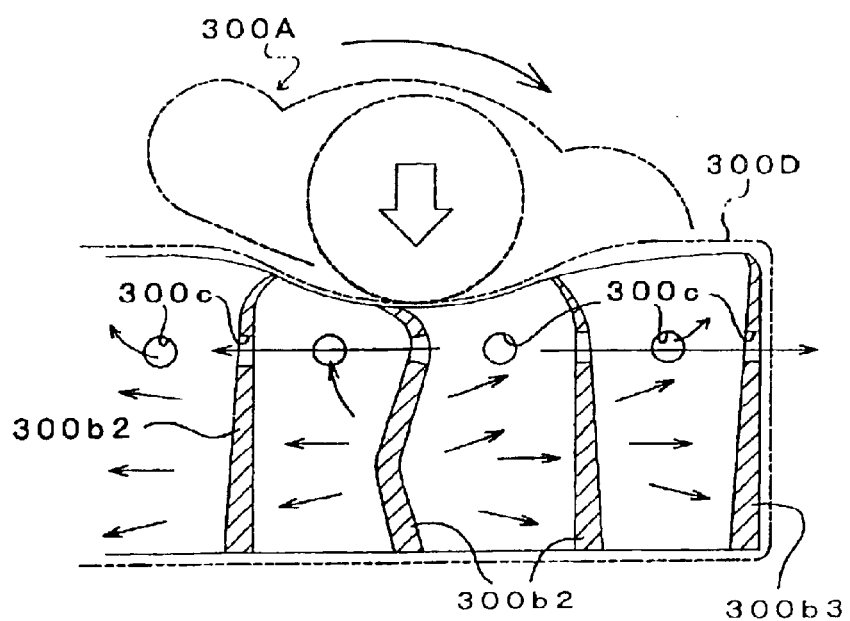
FIG. 13 is a vertical sectional view of the cushion on which a user's weight is applied, with an air vent provided in a diaphragm.

Thus, for the cushion 300B including the vertical and horizontal diaphragms 300b1, 300b2, and side wall 300b3, the upper edges that are the softest are elastically bent and deformed to achieve soft feeling of touch in an initial state where the user 300A touches the contact surface, the diaphragms 300b1, 300b2, and side wall 300b3 start to be bent from the areas of the air vents 300c as the user's weight is applied, and a central portion is buckled to be appropriately elastically deformed. This allows the cushion 300B to achieve soft cushioning like a tip of a brush without feeling of touching a bottom or partial protrusions (FIG. 13).

Also, as described above, each diaphragm is provided with the air vent 300c, so that even if the user's weight is applied on the cushion 300B, and the diaphragms 300b1, 300b2, and the side wall 300b3 are buckled with an opening 300b4 of the lattice blocked by a body surface of the user 300A, air in a space in the lattice flows out into an adjacent lattice through the air vent 300c. As a result, the disadvantage of the injection noise generated by air in the space in the lattice drastically flowing from a gap between the body surface of the user and the opening 300b4 can be prevented even when the inside of the diaphragm of the contact area is compressed by the weight or change of attitude of the user.

For the air vents c provided in the diaphragms 300b1, 300b2, and side wall 300b3 as described above, two air vents may be provided in each of the diaphragms 300b1, 300b2, side wall 300b3 at a height ranging from 60% to 80% of the height h like a cushion 300B' shown in FIG. 17. In this case, the elastic deformation property of the diaphragm can be set finely by changing an opening area of a pair of air vents 300c or location within the above described range. More than two air vents may be provided as the air vents 300C.

Figure 14:
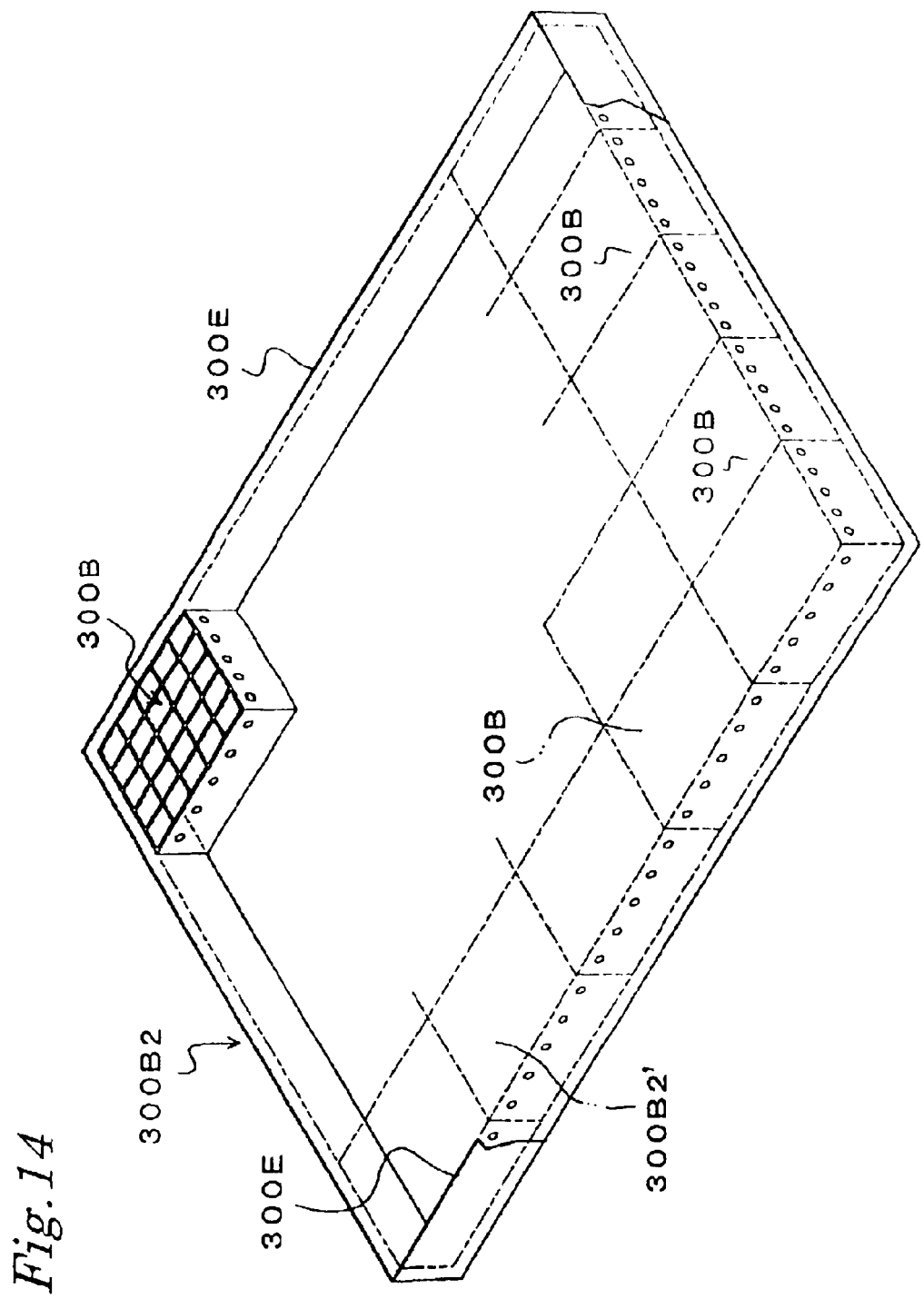
FIG. 14 is a perspective view, partly notched, of a bed cushion with a frame body provided around a cushion body for a bed integrally formed with the cushions vertically and horizontally arranged.
Figure 15:
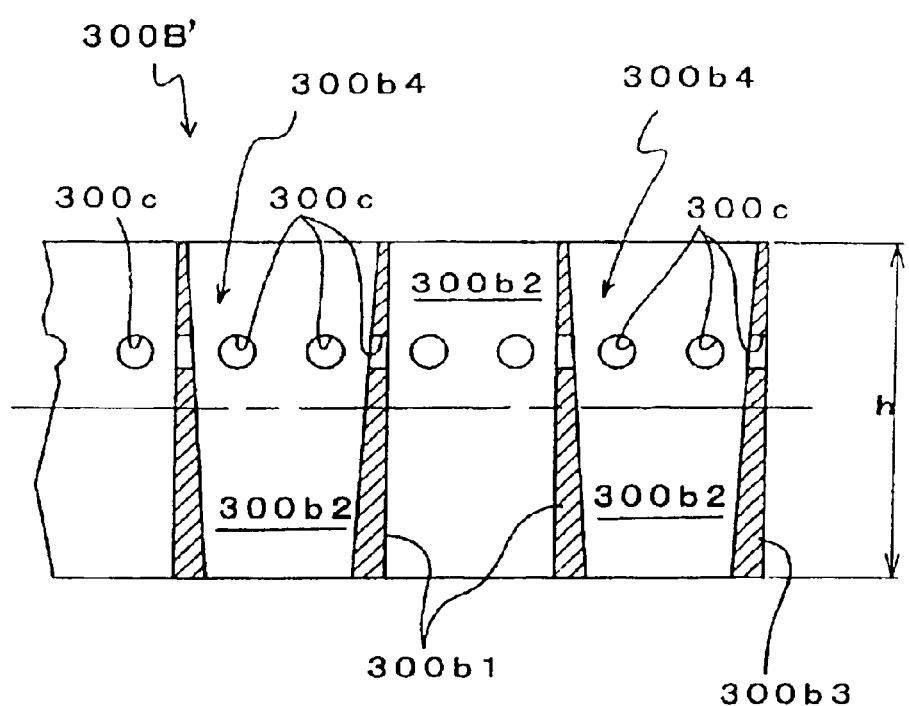
FIG. 15 is a vertical sectional view of cushions with two air vents.

Next, a bed cushion 300B2 shown in FIG. 14 and FIG. 15 will be described.

This bed cushion 300B2 includes a cushion body 300B2' and a frame body 300E, and is used as a cushion for a normal bed or a bed for preventing bedsore.

The cushion body 300B2' is configured as one piece of cushion having substantially identical size to a bottom surface of a bed by vertically and horizontally arrange the cushions 300B in one plane and attaching peripheral diaphragms 300b3 of adjacent cushions using a stapler or an adhesive (FIG. 19). The frame body 300E formed by a wooden frame or the like is provided around the cushion body 300B2' configured as described above to hold a periphery of the cushion body 300B2'.

The diaphragms 300b1, 300b2, and side wall 300b3 constituting the cushion 300B of this embodiment are set to have a height of 10 to 300 mm and a lattice width of diaphragm of 5 to 200 mm. For the diaphragms 300b1, 300b2, and side wall 300b3 of the cushion 300B used as the normal bed or the bed for preventing bedsore, a ratio of the diaphragm 300b1 arranged vertically of the bed and the diaphragm 300b2 arranged horizontally of the bed may be identical to a vertical-to-horizontal ratio of the bed.

A described above, the configured cushion body 300B2' is fitted in the frame body 300E formed by wooden plates or the like, the peripheral diaphragm 300b3 of the cushion body 300B2' is mounted to be fixed to an inner peripheral surface of the frame body 300E by attaching means such as adhesion or a stapler, thereby holding the periphery of the cushion body 300B2' by the frame body 300E.

The cushion 300B2 can be placed on the bottom surface of the bed to be used. The cushion 300B2 is preferably used with a cloth cover or the like.

The cushion 300B2 configured as described above provides a soft touch like a water bed by the elasticity property of each cushion 300B. The user's weight can be received with the periphery of the cushion body 300B2' suspended by the frame body E, thereby preventing disadvantage that the peripheral area is crashed to touch the bottom even when load is applied near the periphery of the cushion body 300B2' by, for example, rolling over of the user.

In the cushion 300B2, the air vent 300c is provided in the side wall 300b3 of each cushion 300B corresponding to the peripheral surface of the cushion body 300B2', but the side wall does not always require the air vent 300c. Even if the side wall 300b3 is not provided with the air vent 300c, air can be flown out through the air vent 300 of the adjacent diaphragms 300b1, 300b2, and can be flown out through the opening 300b4 of the lattice near the peripheral surface of the cushion body 300B2', thereby allowing an effect of preventing air injection noise to be maintained.

In this embodiment, between the adjacent cushions 300B, the air vents 300c respectively provided in the diaphragms 300b3 are aligned to cause the space of insides of the lattices of the cushions 300B to communicate. This structure is effective in preventing injection noise. However, the air vent 300c of the side wall 300b3 is not necessarily required, and air can be flown out through the diaphragms 300b1, 300b2 other than the side wall 300b3 or the openings 300b4 without the air vent 300c provided, thereby allowing an effect of preventing air injection noise to be maintained.

The cushion body 300B2' can be used as a floor cushion to be laid on a mat or the like as it is without the frame body 300E mounted. Also in this case, the cushion body 300B2' covered with a sheet such as a cloth is preferably used.

As described above, the third embodiment of the invention of the present application is the cushion made of elastomer and integrally formed with the elastic thin diaphragms 300b, 300b2, and the side wall 300b3 arranged in a lattice on plan view, wherein the air vent 300c is provided in an appropriate position of each of the diaphragms 300b1, 300b2, and the side wall 300b3, so that even if the diaphragms are buckled with the opening 300b4 of the lattice blocked by the body surface of the user 300A, the air in the space in the lattice flows out into the adjacent lattice through the air vent 300c. Therefore, even if the air in the lattice of the diaphragm is compressed by rolling over of the user 300A as is conventional, injection of compressed air from the opening is avoided, and thus, generating the injection noise of the air in rolling over can be effectively prevented.

Further, providing the air vent in the appropriate position of each of the diaphragms 300b1, 300b2, and the side wall 300b3 as described above achieves a flexible deformation property of the diaphragms 300b1, 300b2, and the side wall 300b3 and softens the touch, so that a feeling of use with a cushioning property closer to a water bed can be obtained.

The cushion 300B includes the diaphragms 300b1, 300b2, and the side wall 300b3 having tapered sections from lower edges to upper edges, thereby providing flexible deformation like a tip of a brush at the upper edge of each of the longitudinal diaphragm 300b1, the horizontal diaphragm 300b2, and the side wall 300b3 to be a contact surface of the cushion 300b. Then, in an initial contact state where the weight of the user 300A is applied, as described above, the upper edge is flexibly and elastically deformed further forward than the buckled side wall, and very soft feeling of touch that has never been obtained before can be achieved together with flexibility of the diaphragm by the air vent 300c as described above.

Next, a fourth embodiment of the invention of the present application will be described with reference to the drawings.

FIG. 16 and FIG. 17 show a mold 400a for a cushion that embodies the present invention. The mold 400a includes a first mold 401 to be a lower mold, a second mold 402 to be an upper mold, and an outer frame 403 to be fitted to surround four peripheral surfaces of the fitted first and second molds 401, 402.

The cushion 400b formed by the mold 400a is integrally formed using elastomer, thin and vertical diaphragms 400b2 and horizontal diaphragms 400b1 are arranged in a lattice on plan view, and peripheries thereof are surrounded by a diaphragm 400b3.

The first mold 401 has a predetermined number of middle protrusions 401b integrally formed vertically and horizontally in a protruding manner on an upper surface of a substrate 401a of rectangular shape on plan view through spaces to be inserting portions 401c. The middle protrusions 401b and inserting portions 401c are alternately arranged like a checkerboard on plan view (FIG. 16).

The second mold 402 has a predetermined number of protrusions 402b integrally formed vertically and horizontally on a lower surface of a substrate 402a through insertion spaces 402c. A space keeping protrusion 402d that relatively slightly protrudes from the lower surface of the substrate 402a in each insertion space 402c is integrally formed in a protruding manner.

The space keeping protrusions 402d and protrusions 402b formed in the insertion spaces 402c are alternately arranged like a checkerboard on plan view, and are adapted to be inserted in the respective inserting portions 401c of the first mold 401 when the molds are fitted. The middle protrusions 401b of the first mold 401 are adapted to be inserted in the respective insertion spaces 402c of the second mold 402, their tip surfaces abutting against end surfaces 402d' of the space keeping protrusions 402d with shapes thereof matched.

Specifically, each middle protrusion 401b of the first mold 401 has a section shape identical to that of each space keeping protrusion of the second mold 402, and is adapted to have the same height and contour as the protrusion 402b of the second mold 402 in an abutting state when the molds are fitted. Each protrusion 402b of the second mold 402 is fitted in the inserting portion 401c of the first mold 401 to abut against the upper surface of the substrate 401a when the molds are fitted. With both the first and second molds 401, 402 fitted, frame bodies 403a, 403b forming an outer frame 403 are abutted against four peripheral surfaces of the substrates 401a, 402a to form an outer frame 403 of square shape on plan view (FIG. 17).

Accordingly, when both the first and second molds 401, 402, and frame bodies 403a, 403b configured as described above are fitted, as shown in FIG. 17, a gap for forming a lattice-like cushion 400b to be a structure, that is, a cavity 404 is formed between each coupled article of the middle protrusion 401b of the first mold 401 and the space keeping protrusion 402d of the second mold 402 and each protrusion 402b of the second mold 402 (FIG. 18). As described above, after the molds are fitted, a material made of thermoplastic elastomer is charged into the cavity 404, which is filled therewith.

Each protrusion 402b of the second mold 402 is provided with a slight drawing gradient toward a protruded end so as to facilitate stripping the product formed in the cavity 403 from a surface of the cavity. Therefore, a drawing gradient of the protrusion 402b is set in such a manner that the cushion 400b formed remains in the first mold 401 that has relatively higher adhesion in separation of the first mold 401 and second mold 402, and the frame bodies 403a, 403b (FIG. 19).

After separation of the mold 400a, a worker removes the cushion 400b remaining in the first mold 401. At this time, the cushion 400b remaining in the first mold 401 is formed with an opening 400b4' that is formed after drawing of the space keeping protrusion 402d together with a hollow portion 400b4 of a lattice formed by the protrusion 402b of the second mold 402.

When removing the cushion 400b, the worker can pick an opening edge of the opening 400b4' and successively strip attached portions between the surface of the middle protrusion 401b1 and the diaphragms 400b1, 400b2, and side wall 400b3 to remove the cushion 400b from the mold, which permits smooth removal operation of the structure.

In the cushion 400b removed from the mold, a partition line 400b5 remains on a peripheral wall in the opening 400b4' formed by the coupled article of the space keeping protrusion 402d and the middle protrusion 401b. An inner surface of the opening 400b4' formed at the protrusion 402b of the second mold 4002 is somewhat tapered (FIG. 20). The mold 400d of the present invention may be set in such a manner that the structure remains in the second mold 402 side when the cushion 400b is formed as described above. A ratio of a height between the space keeping protrusion 402d of the second mold 2 and the middle protrusion 401b of the first mold 401, that is, a position of the partition line 400b5 may be appropriately changed. The drawing gradient may be provided on the coupled article of the space keeping protrusion 402d and the middle protrusion 401b in accordance with the forms of the lattice diaphragms 400b1, 400b2 of the structure.

Each protrusion 402b of the second mold 402 is provided with a slight drawing gradient toward a protruded end so as to facilitate stripping the structure formed in the cavity 404 from a surface of the cavity. Therefore, a drawing gradient of the protrusion 402b is set in such a manner that the cushion 400b formed in the cavity 404 remains in the first and second molds 401, 402 that has relatively higher adhesion by separation of the first and second molds 401, 402, and the frame bodies 403a, 403b (FIG. 19).

When removing the cushion 400b, the worker can pick an opening edge of the opening 400b4' and successively strip attached portions between the surface of the middle protrusion 400b1 and the diaphragms 400b1, 400b2, and side wall 400b3 to remove the cushion 400b from the mold, which permits smooth removal operation of the structure.

The cushion 400b formed substantially in a lattice on plan view includes vertical and horizontal diaphragms 400b1, 400b2, and peripheral side wall 400b3. The vertical and horizontal diaphragms 400b1, 400b2, and peripheral side wall 400b3 arranged in the lattice are buckled when the user's weight is applied to function as a cushion.

The diaphragms in a lattice are set to have a height of 10 to 300 mm and a lattice width of 5 to 200 mm.

For the diaphragms of the cushion 400b used as the normal bed or the bed for preventing bedsore, a ratio of the diaphragms 400b1 arranged vertically of the bed and the diaphragms 400b2 arranged horizontally of the bed may be identical to a length to width ratio of the bed 400c.

Figure 21:
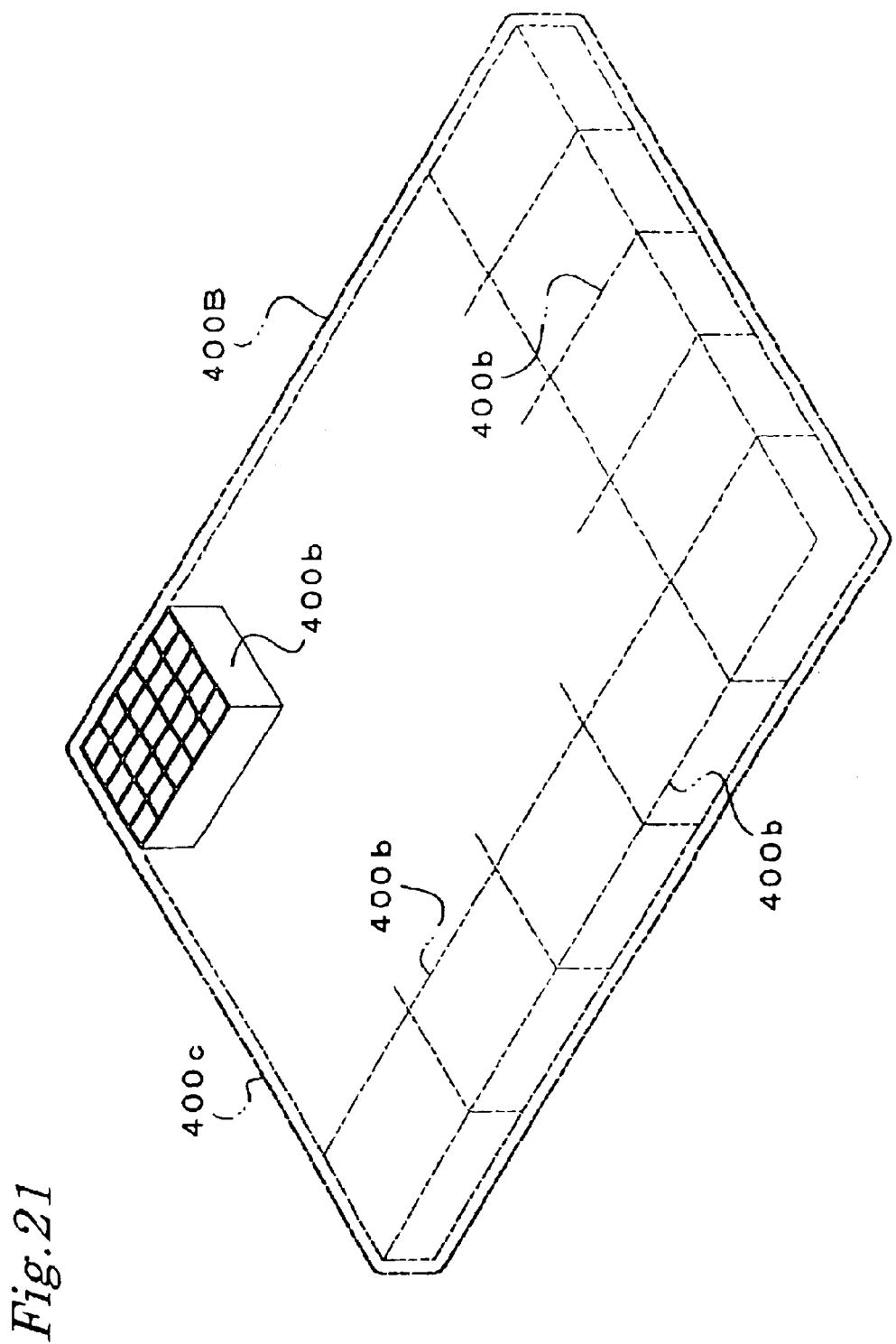
FIG. 21 is a perspective view of a cushion material for a bed being configured with the cushion materials vertically and horizontally arranged.

As described above, the cushion 400b is used as a cushion for a bed, a chair, a sofa, or the like, and for a large article such as a bed, as shown in FIG. 21, the cushions 400b are vertically and horizontally arranged to be integrated by adhesion or a stapler to form a bed 400c.

The fourth embodiment having the above described features produces below mentioned effects.

The mold for the cushion of the invention is configured as described above, so that the thermoplastic elastomer is injected into the cavity 404 with the first and second molds 401, 402 and the outer frame mold 403 fitted to form the cushion with thin and vertical diaphragms 400b1, 400b2, and the side wall 400b3 arranged in a lattice. Then, in dismantling the first and second molds 401, 402 and the outer frame mold 403, the cushion 400b as the structure remains fitted in each middle protrusion 401b of the first mold 401 having relatively high adhesion.

As described above, for the cushion 400b remaining in the first mold 401, with the second mold 403 removed, each protrusion 402b of the second mold 402 is drawn from the structure, and a portion of the space keeping protrusion having abutted against the end surface of the middle protrusion 401b of the first mold 401 is removed to be opened.

Therefore, when taking out the structure from the first mold 401, the worker can pick the edges of the opened structure to strip and draw the cushion 400b as the structure from the cavity 404, allowing easy and neat stripping without blocking traces.

In the cushion 400B with thin diaphragms 401, 402 and the outer frame mold 403 arranged in a lattice, the diaphragms 401, 402 and the outer frame mold 403 are buckled in particular at the partition lines when load of the user is applied on the cushion, thereby causing no feeling of touching a bottom, and having flexibility and satisfactory absorption of light load. Therefore, by prevention of touching the bottom or equal distribution of pressure, the cushion can be used for a chair or a sofa as well as a normal bed, and is especially ideal for use in a bed for preventing bedsore.

Next, a fifth embodiment of the invention of the present application will be described.

Figure 22:
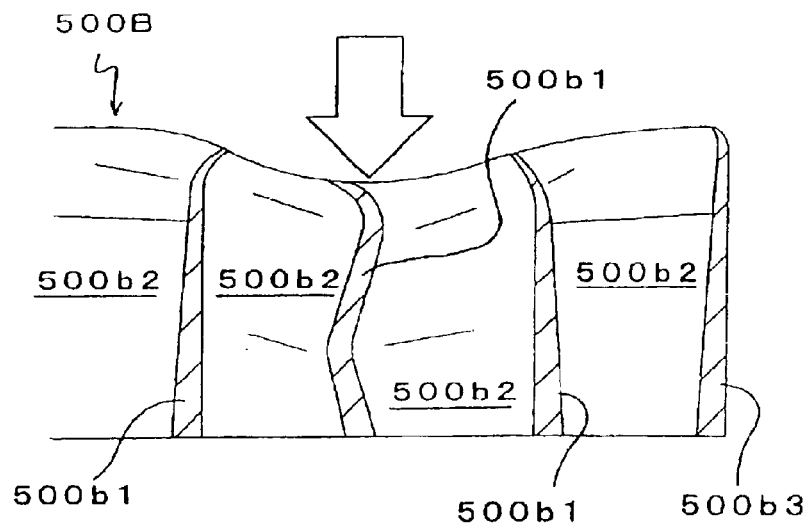
FIG. 22 is a vertical sectional view of deformation of a diaphragm when load is applied on the cushion.

A cushion 500B shown in FIG. 22 and FIG. 34 is integrally formed using elastomer, thin vertical horizontal diaphragms 500b2 and longitudinal diaphragms 500b1 are arranged in a lattice on plan view, and peripheries thereof are surrounded by a side wall 500b3.

The cushion 500B is integrally formed using the same mold as in the fourth embodiment.

The cushion 500B formed substantially in a lattice on plan view includes the longitudinal diaphragm 500b1, the horizontal diaphragm 500b2, and the side wall 500b3. The diaphragms 500b1, 500b2, and the side wall 500b3 arranged in a lattice are buckled when the user's weight is applied to function as a cushion with high elasticity.

Specifically, the longitudinal diaphragm 500b1, the horizontal diaphragm 500b2, and the side wall 500b3 are formed to have tapered sections so as to be thinner at upper edges than lower edges thereof, so that bending of the longitudinal diaphragm 500b1, the horizontal diaphragm 500b2, and the side wall 500b3 to be a contact surface of the cushion 500B is gradually reduced from the lower edge to the upper edge, and satisfactory deformability can be achieved at the upper edge.

Thus, for the cushion 500B including the longitudinal diaphragm 500b1, the horizontal diaphragm 500b2, and the side wall 500b3, the upper edges that are the softest are elastically bent and deformed to achieve soft feeling of touch in an initial state where the user touches the contact surface, and further, a rear of a central portion of each of the longitudinal diaphragm 500b1, the horizontal diaphragm 500b2, and the side wall 500b3 is buckled to be appropriately elastically deformed as the user's weight is applied, thereby allowing satisfactory cushioning without feeling of touching a bottom or partial protrusions.

Figure 23:
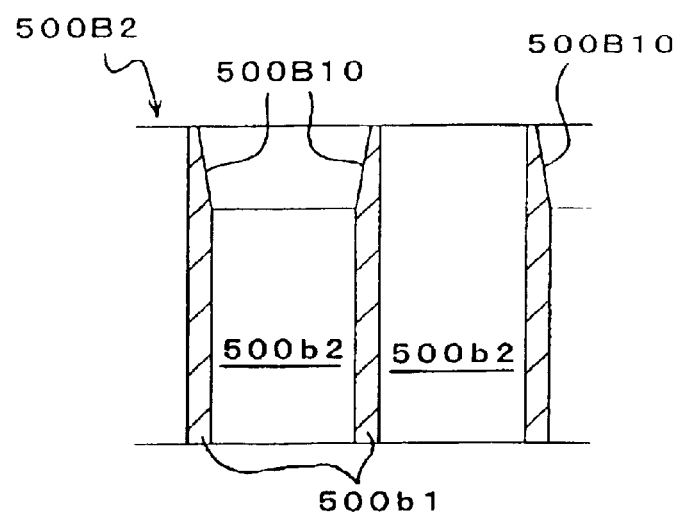
FIG. 23 is a vertical sectional view of a cushion having a diaphragm with a tapered upper edge.

Next, a cushion 500B2 shown in FIG. 23 will be described.

The elastic thin cushion 500B2 is a cushion made of elastomer and integrally formed with elastic thin longitudinal diaphragms 500b1, horizontal diaphragms 500b2, and side walls 500b3 arranged in a lattice on plan view similarly to the cushion 500B, but each of the longitudinal diaphragm 500b1, the horizontal diaphragm 500b2, and the side wall 500b3 is tapered only at an upper edge 500B10. Each of them becomes gradually thinner and is tapered toward the upper edge.

Specifically, in the cushion 500B2, the longitudinal diaphragm 500b1, the horizontal diaphragm 500b2, and the side wall 500b3 become gradually thinner and are tapered toward the upper edges only near the upper edges 500B10.

Figure 24:
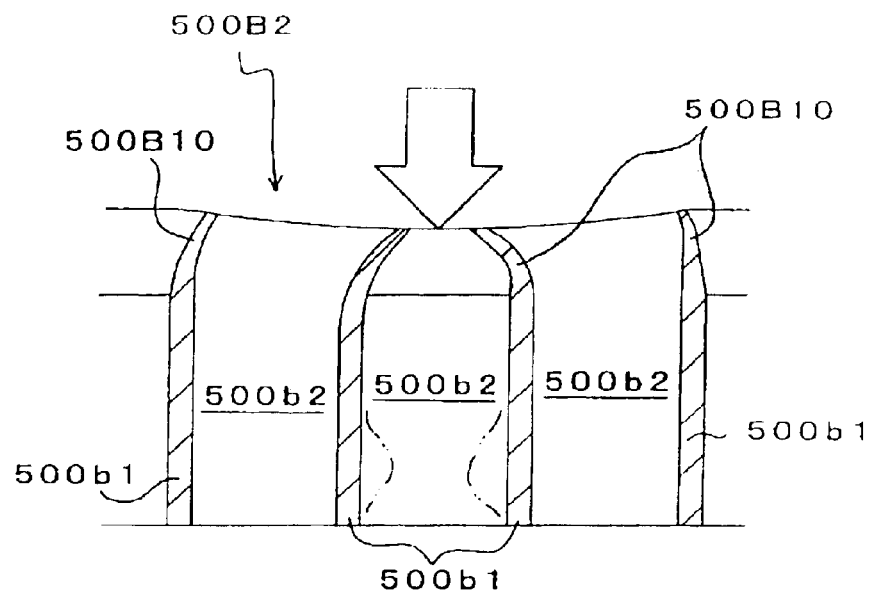
FIG. 24 is a vertical sectional view of an upper edge of the cushion having a diaphragm with a tapered upper edge being bent.

Therefore, in an initial state where a user touches the contact surface, the longitudinal diaphragm 500b1, the horizontal diaphragm 500b2, and the side wall 500b3 are partly and flexibly buckled and deformed at the upper edges 500B10 with taper to achieve a softer feeling of touch (FIG. 24). Then, as the user's load increases, a central portion of each of the longitudinal diaphragm 500b1, the horizontal diaphragm 500b2, and the side wall 500b3 is bent to have a triangular or S shaped section to be appropriately elastically deformed (shown by phantom lines), thereby achieving satisfactory cushioning without a feeling of touching the bottom or a protrusion caused by a crossing portion of the diaphragm. The feeling of touch and cushioning are similar to those of a water bed, and are very soft. A ratio of tapered thickness of the tapered upper edges of the vertical diaphragm and the horizontal diaphragm as described above may be appropriately changed in accordance with elasticity or thickness of the elastomer.

Figure 25:
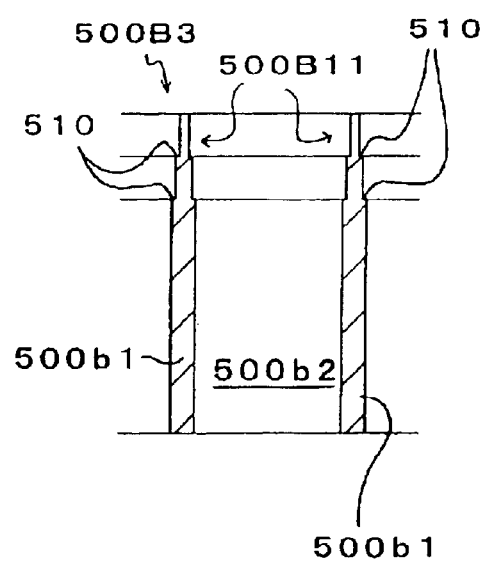
FIG. 25 is a vertical sectional view of a cushion having a diaphragm with a stepwise tapered upper edge.

Next, a cushion 500B3 shown in FIG. 25 will be described.

The cushion 500B3 is a cushion made of elastomer and integrally formed with elastic thin longitudinal diaphragms 500b1, horizontal diaphragms 500b2, and side walls 500b3 arranged in a lattice on plan view similarly to the cushion 500B2, but each of the diaphragms 500b1, 500b2, and the side wall 500b3 has an upper edge 500b11 that becomes gradually thinner by forming a plurality of steps 510 near the upper edges 500b11. For the steps formed on the tapered portions, two steps 510 are formed to have three levels of tapered thickness in this embodiment, but two levels or four or more levels are acceptable.

When the longitudinal diaphragm 500b1, the horizontal diaphragm 500b2, and the side diaphragm 500b3 become gradually thinner by forming the plurality of steps 510 as described above, a height of the upper edge may be increased or decreased. For example, the diaphragms and the side wall may be provided with appropriate number of steps 510 across the diaphragms and the side wall from the lower edge to the upper edge, and gradually tapered along the entire height of the diaphragms and the side wall like the taper of the cushion 500B.

In the cushion B3, taper is provided by forming the steps 510 along the upper proximity of the diaphragms 500b1, 500b2, and side wall 500b3 similarly to the cushion B2, and therefore the cushion B3 has a satisfactory cushioning property similarly to the cushion 500B2. The steps 510 are formed, which allows portions bent by the load and a bending manner (buckling manner) to be relatively easily set, thereby providing uniform elastic bounce by the diaphragms 500b1, 500b2 and side wall 500b3 and equal cushioning on the contact surface of each area.

Figure 26:
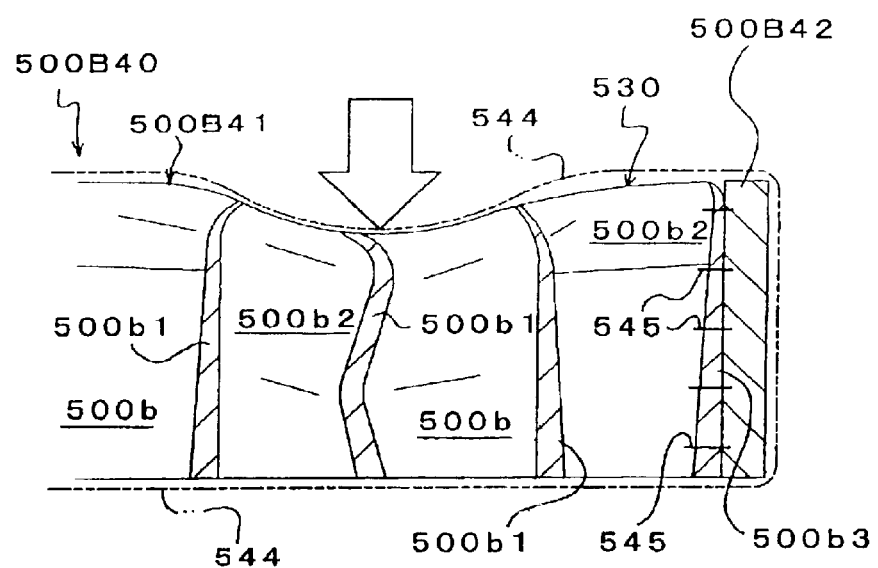
FIG. 26 is a vertical sectional view of load being applied on a bed cushion.
Figure 27:
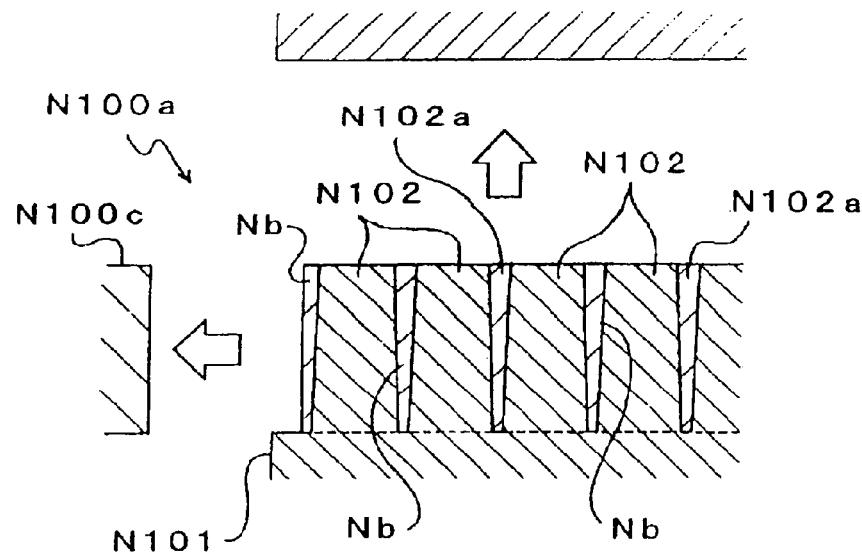
FIG. 27 is a vertical sectional view of a conventional mold for a cushion being dismantled.
Figure 28:
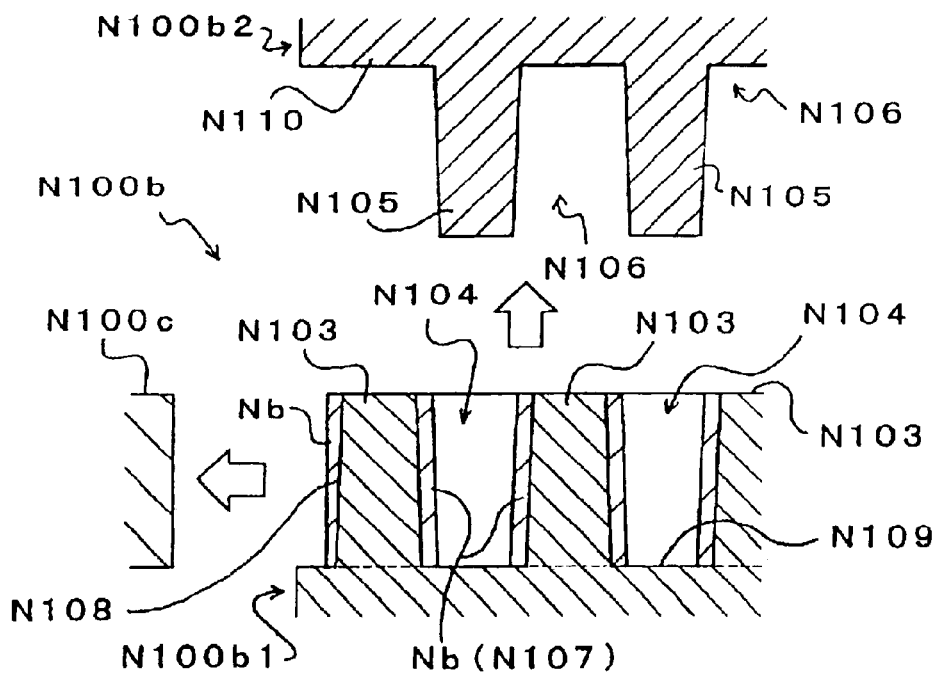
FIG. 28 is a vertical sectional view of a conventional mold for a cushion provided with protrusions on both of an upper mold and a lower mold being dismantled.
Figure 29:
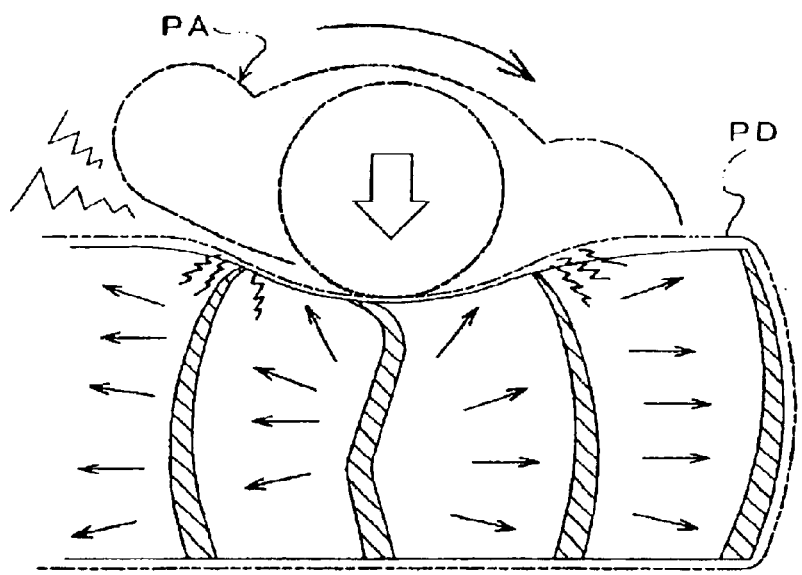
FIG. 29 is a vertical sectional view of a conventional cushion on which a user's weight is applied to generate injection noise.

Next, a bed cushion 500B40 shown in FIG. 26 will be described.

This cushion 500B40 is used as a cushion for a normal bed or a bed for preventing bedsore, and includes a cushion body 500B41 formed by vertically and horizontally arranging the cushion 500B configured similarly to the cushion body 500B (or 500B2, 500B3), and a frame body 500B42 holding the cushion body 500B41.

The cushion body 500B41 is configured as one piece of cushion having substantially identical size to a bottom surface by vertically and horizontally arranging the cushions 500B or 500b2, 500b3 in one plane and attaching peripheral diaphragms 500b3 of adjacent cushions using a stapler or an adhesive.

The cushion 500B41 configured as described above is fitted in the frame body 500B42 formed by wooden plates or the like, the peripheral diaphragm 500b3 in contact with the periphery of the cushion body 500B41 is mounted to be fixed to an inner peripheral surface of the frame body 500B42 by attaching means such as adhesion or a stapler 545, thereby holding the entire periphery of the cushion body 500B41 by the frame body 500B42.

The bed cushion 500B40 configured as described above is preferably covered with a cloth cover 544. The bed cushion 500B40 can be placed on a bottom surface of the bed to be used.

Specifically, the cushion 500B40 provides satisfactory cushioning and a soft touch like a water bed similarly to the cushions 500B, 500B2, 500B3. The user's weight can be received with the periphery of the cushion body 500B41 suspended by the frame body 500B42, thereby preventing disadvantage that the peripheral area is crashed to touch the bottom even when load is applied near the periphery of the cushion body 500B41 by, for example, rolling over of the user.

The diaphragms 500b1, 500b2, and side wall 500b3 constituting the cushion 500B40 of this embodiment are set to have a height of 10 to 300 mm and a lattice width of 5 to 200 mm. For the diaphragms 500b1, 500b2, and side wall 500b3 of the cushion body 500B, 500B2, 500B3 used as the normal bed or the bed for preventing bedsore, a ratio of the vertical diaphragm 500b1 arranged vertically of the bed and the horizontal diaphragm 500b2 arranged horizontally of the bed may be identical to a vertical to horizonatl ratio of the bed.

The cushion formed substantially in a lattice on plan view includes the vertical diaphragm, the horizontal diaphragm, and the peripheral side walls. The diaphragms and the side wall arranged in the lattice are buckled when the user's weight is applied to function as a cushion with high elasticity.

Specifically, the diaphragms and the side wall are formed to have the tapered sections so as to be thinner at the upper edges than the lower edges thereof or to become gradually thinner toward the upper edge, so that bending of the diaphragms and the side wall to be a contact surface of the cushion is gradually reduced from the lower edge to the upper edge, and satisfactory deformability can be obtained at the upper edge.

For the cushion B including the diaphragms 500b1, 500b2, 500b3, the upper edges that are the softest are elastically bent and deformed to achieve soft feeling of touch in an initial state where the user touches the contact surface.

What is claimed is:

1. A cushion made of elastomer integrally formed with elastic thin diaphragms arranged in a lattice on plan view comprising:

an air vent provided in a predetermined position of said diaphragm at a height ranging from 60% to 80% of a height of the diaphragm; and said diaphragm having a section tapered from a lower portion to an upper portion.

2. A cushion with thin and vertical diaphragms to be buckled when pressed arranged in a lattice, characterized in that:

said diaphragms are made of elastomer and contain lubricant of 0.3 to 10 parts by weight with respect to said elastomer of 100 parts by weight; and the elastomer forming the diaphragms contains a filler, and is low expansion elastomer with an expansion ratio of 1.01 to 2.

3. A cushion with thin and vertical diaphragms to be buckled when pressed arranged in a lattice, characterized in that:

said diaphragms are made of elastomer and contain lubricant of 0.3 to 10 parts by weight with respect to said elastomer of 100 parts by weight;

the lubricant is a fatty acid based lubricant; and the elastomer forming the diaphragms contains a filler, and is low expansion elastomer with an expansion ratio of 1.01 to 2.

4. A cushion with thin and vertical diaphragms to be buckled when pressed arranged in a lattice, characterized in that:

said diaphragms are made of elastomer and contain lubricant of 0.3 to 10 parts by weight with respect to said elastomer of 100 parts by weight; and the elastomer forming the diaphragms is elastomer into which acrylic soft resin is mixed.

5. A cushion with thin and vertical diaphragms to be buckled when pressed arranged in a lattice, characterized in that:

said diaphragms are made of elastomer and contain lubricant of 0.3 to 10 parts by weight with respect to said elastomer of 100 parts by weight; and a powder is attached to the elastomer forming the diaphragms.

* * * * *